(12) United States Patent
Stone

(10) Patent No.: US 10,392,763 B2
(45) Date of Patent: Aug. 27, 2019

(54) MULTIPURPOSE BLOWER ASSEMBLY

(71) Applicant: Martin William Stone, Arden Hills, MN (US)

(72) Inventor: Martin William Stone, Arden Hills, MN (US)

(73) Assignee: DC Lien, Blaine, MN (US)

( * ) Notice: Subject to any disclaimer, the term of this patent is extended or adjusted under 35 U.S.C. 154(b) by 27 days.

(21) Appl. No.: 15/908,817

(22) Filed: Mar. 1, 2018

(65) Prior Publication Data

US 2018/0251947 A1    Sep. 6, 2018

Related U.S. Application Data

(60) Provisional application No. 62/465,598, filed on Mar. 1, 2017.

(51) Int. Cl.
*B01F 15/00* (2006.01)
*E02B 1/00* (2006.01)
(Continued)

(52) U.S. Cl.
CPC .............. *E02B 1/003* (2013.01); *B01F 5/108* (2013.01); *B01F 7/00741* (2013.01);
(Continued)

(58) Field of Classification Search
CPC ...... E02B 1/003; B01F 5/108; B01F 7/00741; B01F 15/00175; B01F 15/00201;
(Continued)

(56) References Cited

U.S. PATENT DOCUMENTS 3,109,288 A    11/1963  Gross
4,525,125 A     6/1985  Matsumoto et al.
(Continued)

FOREIGN PATENT DOCUMENTS

CN         105370601 A      3/2016
DE    10 2004 028 877 A1    1/2006

OTHER PUBLICATIONS

Online brochure from "https://www.scottaerator.com/dock-mounted-aquasweep" offering for sale, as early as Jan. 2012, a product referred to as "AquaSweep" and attached Figs. 1 & 2 as representative images of product for discussion.
(Continued)

*Primary Examiner* — Anshu Bhatia
(74) *Attorney, Agent, or Firm* — Michael A. Mochinski

(57) ABSTRACT

A multipurpose blower assembly for stimulating flows in underwater environments, which includes a lower assembly connecting to an upper assembly by a rotating shaft and a mount post for connecting the blower assembly to a supportive structure near a water body and supporting the lower assembly below and the upper assembly above the water body's surface. The lower assembly includes a lower bracket for supporting a blower motor, whereas the upper assembly includes a top plate for mounting an electrical gear motor having an output shaft connecting to the rotating shaft and a system controller having a microcontroller communicatively coupled to logic circuits for controlling operation of the electrical gear motor for rotation of the lower assembly relative to the upper assembly and a linear actuator to move upward and downward the lower bracket to effect angular positioning of the blower motor.

38 Claims, 32 Drawing Sheets

(51) Int. Cl.
*C02F 7/00* (2006.01)
*F04D 13/08* (2006.01)
*B01F 5/10* (2006.01)
*B01F 7/00* (2006.01)
*F04D 15/00* (2006.01)
*C02F 103/00* (2006.01)

(52) U.S. Cl.
CPC .. B01F 15/00175 (2013.01); B01F 15/00201 (2013.01); B01F 15/00285 (2013.01); B01F 15/00305 (2013.01); B01F 15/00331 (2013.01); B01F 15/00474 (2013.01); B01F 15/00538 (2013.01); C02F 7/00 (2013.01); F04D 13/086 (2013.01); *B01F 2215/0052* (2013.01); *C02F 2103/007* (2013.01); *C02F 2209/001* (2013.01); *C02F 2209/008* (2013.01); *C02F 2209/02* (2013.01); *F04D 15/00* (2013.01)

(58) Field of Classification Search
CPC .......... B01F 15/00285; B01F 15/00305; B01F 15/00331; B01F 15/00474; B01F 15/00538; B01F 2215/0052; C02F 7/00; C02F 2103/007; C02F 2209/001; C02F 2209/008; C02F 2209/02; F04D 13/086; F04D 15/00

See application file for complete search history.

(56) References Cited

U.S. PATENT DOCUMENTS

| | | |
|---|---|---|
| 5,017,093 A | 5/1991 | Naes |
| 5,032,998 A | 7/1991 | Filleau |
| 5,266,004 A | 11/1993 | Tsumurai et al. |
| 6,550,607 B1 | 4/2003 | Watson et al. |
| 9,043,964 B2 | 6/2015 | Nickerson et al. |
| 9,179,612 B2 | 11/2015 | Nelson et al. |
| 2008/0124230 A1* | 5/2008 | Geremia ............. B01F 3/04588 417/365 |
| 2009/0256269 A1* | 10/2009 | Sun ..................... B01F 3/04539 261/93 |
| 2017/0118907 A1* | 5/2017 | Nuhn .................. B01F 5/0206 |

OTHER PUBLICATIONS

Website pages from "https://weedersdigest.com/aqua-thruster-lake-muck-silt-weed-control-prevention-blower/" offering for sale, as early as Jan. 2012, a product referred to as "AquaThruster" and attached Fig. 1 as representative image of product for discussion.

* cited by examiner

220

222

MULTIPURPOSE BLOWER ASSEMBLY

CROSS-REFERENCE TO RELATED APPLICATIONS

This application claims the benefit of U.S. Provisional Application No. 62/465,598, filed Mar. 1, 2017, entitled "Multipurpose Blower Assembly," the disclosures of which, including all attached documents, are incorporated herein by reference in their entirety for all purposes.

FIELD OF THE INVENTION

The present invention is directed to a multipurpose blower assembly for use in stimulating flow in underwater environments. More specifically the multipurpose blower assembly is configured with a system controller for moving a powered blower motor in a sweeping radial pattern and upward and downward motion to effectuate widespread water circulation so as to facilitate aeration, prevent formation of ice upon surface waters, and mitigate occurrences of undesirable aquatic growth, such as weeds, algae and the like from forming in a shallow body of water that may otherwise be considered unaesthetically pleasing and unhealthy to human and animal populations.

BACKGROUND OF THE INVENTION

Surface water bodies in the form of lakes, ponds, reservoirs, rivers, and canals offer an abundance of resources generally beneficial to human and animal populations as well as to a variety of plant and marine species. Nevertheless, the presence of excessive nutrient levels within the water body can have a profound impact on those that depend on and make use of the resource unless corrective mitigative measure are implemented, at least on an interim basis to allow continued, uninterrupted use of the resource.

Lakes for instance may serve as an aesthetically pleasing setting; a fresh water supply; an ecological habitat for aquatic or marine life; a recreational area for boating, swimming, and fishing; and means for irrigation and stormwater control. The availability of the resource in terms of water quality, however, may be unduly compromised by the introduction of nutrients in the form of nitrogen and/or phosphorus that can disrupt the delicate ecological balance and unwittingly allow the surface water body to progress towards a eutrophic (nutrient rich) state from an oligotrophic (nutrient poor) state that is generally characterized as having little to no aquatic plant growth with commendable water clarity.

Although most water bodies start out in an oligotrophic state, human activities may accelerate the successional process or expedite the rate of eutrophication when higher amounts of nutrients are introduced to the water body from a variety of sources, such as deteriorating septic systems, sewer overspill, urban storm water runoff transporting detergents, fertilizers, and organic matter, and atmospheric deposition from industrial sources and automobiles. While the presence of phosphorus is relatively rare in lakes and ponds, human sources can overburden the water body with excessive amounts of phosphorus to the extent of serving as a food source for plants and algae and undesirably increase the vegetation growth within a lake, particularly along the shallow area around the shore of the lake defining the littoral zone where an adequate amount of sunlight is available for sustaining growth of rooted plants (macrophytes).

Algae are microscopic plants that grow naturally in lakes and ponds but are capable of adapting to a wide spectrum of aquatic conditions. Algae are photosynthetic yet lack vascular tissue such as roots and leaves and are considered to be evolutionarily less advanced than higher plant life, such as macrophytes. Algae are the primary producers in the aquatic environment and provide a source of food and energy for other animals. Additionally, during photosynthesis, algae release oxygen into the water column, making it readily available for consumption by living aquatic organisms.

Even though algae constitute an important part of the water body's ecosystem as mentioned above, a rapid growth of their population due an excessive concentration of phosphorus can create a condition called an algal bloom. Algal blooms can form scum or dense mats on the water body's surface and may also affect water color, odor and taste. During an algal bloom the excess algae die while the decomposition process consumes oxygen. This may result in an anoxic or oxygen-depleted condition, which is harmful or fatal to some aquatic animals and organisms. Diatoms and blue-green algae cause the most common algal blooms. Diatoms affect the color of the water such to turn it bright green or brown, but rarely create an offensive odor or scum and may even occur undetected to the casual observer. Conversely, blue-green algal blooms rarely go undetected. The force of wind can concentrate blue-green algae (cyanobacteria) into dense, unsightly surface mats, or surface scum, which may wash up along the shoreline while producing a noxious odor as it undergoes decomposition. Some species of blue-green algae, such as *Anabaena aphanizomenoides*, produce toxins that may be harmful to humans and wild and domestic animals that come into contact with the unsightly substance, whereupon such exposure to humans in particular may induce stomach pains, vomiting, diarrhea, skin or throat irritation, allergic reactions, breathing difficulties, skin rashes, and nerve and liver damage. Although most blooms are not toxic, toxicity is hard to predict. A single species of algae can have toxic and non-toxic strains and a bloom that tests non-toxic one day can become toxic the next day.

Though vegetation in the form of rooted plants and algae are considered an important part of any aquatic system given their capacity to produce oxygen in some instances, there are times when excessive amounts of aquatic vegetation can unduly interfere with the use of the resource. Aquatic vegetation, which had previously grown in unused or undeveloped areas, suddenly presents a problem to recreational users and riparian owners. Prolific growth of aquatic vegetation, particularly along the shoreline of the water body, may bring about problems in the nature of fouled outboard motor props, snagged fishing lines, a declining fishery, uninviting swimming conditions, diminishing aesthetic appeal, and falling property values. In addition to the toxicity of some strains of algae, algae in general can create slippery, hazardous conditions on boat ramps and docks to bring about safety concerns as well as furthering conditions of fish kills caused by die-offs of algal blooms that reduce the amount of available oxygen to living aquatic organisms. Moreover, heavy vegetation growth within swimming areas can impede or obscure swimmers. Offensive odors, pests and the negative perception of "unclean" water at areas of aquatic vegetation growth become uninviting, unsafe, and underutilized if mitigative measures are not implemented to preserve the water body's recognized resource, at least on a localized basis.

While most aquatic problems primarily occur during warmer conditions, colder climatic conditions during winter months equally present a challenge to the resource, notably in the nature of winterkill. Winterkill mainly occurs when snow and ice pack generously cover the water body to the extent of limiting the amount of sunlight reaching the aquatic plants, whereupon the amount of oxygen produced by the aquatic plant is observably reduced. If the aquatic plant dies from the lack of sunlight, the plants start to decompose, which uses oxygen dissolved in the water column, and when oxygen depletion becomes severe enough, fish die. The prolific growth of aquatic vegetation during summer months can account for most of the organic matter undergoing decay during the winter months. A lake bottom comprising an abundance of vegetation is more likely to experience winterkill than a lake lacking such materials and can contribute to the accumulation of decomposing vegetation over time to form a layer of muck about the lake bottom.

Although the ultimate mitigative measure for mitigating growth of aquatic vegetation involves the control of nutrients to the water body from identifiable point sources, it's not always immediately possible due to time and economic constraints. Accordingly, it is desirable to mitigate the prolific growth of aquatic vegetation and spread of algae on a provisional basis within areas generally recognized for use by riparian owners while widespread, long-term control measures are being set in place using best available technologies.

Some of the most common conventional methodologies for short-term implementation, at least from the perspective of maintaining continued use of the water body's resource along the shoreline, involve the mechanical removal of vegetation through harvesting, raking, and cutting; application of chemicals or dyes; localized nutrient deactivation; dredging; water circulation with aeration; or a combination of two or more of these methods. While each of the above methods have merit of affording a short-term solution, some better than others, their adaptation may not always constitute a practical economical solution. For example, mechanical removal may be effective for small areas of filamentous algae and aquatic vegetation growth but is time consuming and labor intensive when controlling larger areas, particularly upon the presence of filamentous algae that has the propensity to grow back rather quickly and may move around the water body through persistent wind and wave action. Further, chemical application in the form herbicide treatment, for example, may be beneficial in controlling a select species of unwanted vegetation growth, but can have a profound impact on the continued use of the resource by human and animal populations. Shading products in the form of dyes can be equally effective in limiting vegetation growth by reducing the amount of sunlight that reaches them if the concentration is maintained at adequate levels, which may be difficult at times given the uncontrolled movement of the water body through wind action and natural circulation. Similarly, dredging can be effective in some respects to deepen an abnormally shallow shoreline such to limit the amount of sunlight reaching the aquatic vegetation present about the lake bottom. On the other hand, water circulation that effects to aerate the water column can be moderately effective in controlling the growth and accumulation of unwanted weeds and algae during warmer and colder climatic conditions. Besides adding oxygen to the water column, aeration with circulation can destratify the layers existing at different temperatures so as to maintain a uniform, consistent oxygen level relatively about the water column during warmer and colder conditions, improve the decomposition of organic matter, moderate the amount of suspended material that generally leads to localized discoloration, reduce offending odors caused by anaerobic conditions, and cause suspended material to fall to the bottom of the lake where bacteria can break it down.

Accordingly, it is desirable to provide an apparatus that is economically viable in maintaining continued, localized use of the resource by moderating the amount of unwanted growth of aquatic vegetation and presence of toxic and non-toxic strains of algal on a sufficient basis that would otherwise be detrimental to the health of human and animal populations and aquatic organisms.

BRIEF SUMMARY OF THE INVENTION

In order to overcome the numerous drawbacks apparent in the prior art a multipurpose blower assembly has been devised for use in stimulating flow in underwater environments for inhibiting undesirable growth of aquatic vegetation near a shoreline that may otherwise be considered unaesthetically pleasing and unhealthy to human and animal populations.

It is an object of the present invention to provide a multipurpose blower assembly that offers widespread radial circulation of water along the shoreline to destratify thermal layers for mitigating formation of ice upon a surface waterbody.

It is an object of the present invention to provide a multipurpose blower assembly that includes a system controller for setting the radial position of a blower motor for a pre-determined time interval to sufficiently develop an outward current that overcomes intrusion of floating and submergible objects carried inward toward the shoreline by natural water convection currents, wave action and the force of wind.

It is another object of the present invention to provide a multipurpose blower assembly that includes auto-correct features to ensure correct installation and reliable, trouble-free operation of a blower motor.

It is another object of the present invention to provide a multipurpose blower assembly that aerates shallow bodies of water such as near the shoreline to facilitate decomposition of aquatic vegetation.

It is another object of the present invention to provide a multipurpose blower assembly that is easily manufactured and assembled to yield reliable, durable performance and lessen the overall cost of manufacture.

It is another object of the present invention to provide a multipurpose blower assembly that includes audible and visual alerts upon realizing adverse operating conditions that may by otherwise damaging to electrical components as well as endangering nearby human and animal populations.

It is yet another object of the present invention to provide a multipurpose blower assembly which accomplishes the foregoing and other objects and advantages and which is economical, durable, and fully effective in performing its intended functions without unduly compromising continued use of a water body along a shoreline.

In accordance with the present invention, a multipurpose blower assembly has been devised for use in stimulating flow in underwater environments, the blower assembly comprising a mount post and a lower assembly connecting to an upper assembly by a rotating shaft, the mount post being attached to the upper assembly and a mid-support plate and having capabilities of being attached to supporting structures such as a dock post by way of a mount bracket particularly as such to support the upper and lower assemblies respectively above and below a surface line of a body of water, the lower assembly including an upper bracket for connecting to the rotating shaft and a lower bracket for mounting and supporting a blower motor, the upper assembly including a top plate for mounting thereon a bearing mount for passage of a first end of the rotating shaft and a system controller having a microcontroller communicatively coupled to logic circuits for controlling operation of an electrical gear motor for precise rotation of the lower assembly relative to the upper assembly and a linear actuator to move upward and downward the lower bracket to effect angular positioning of the blower motor for widespread radial circulation of water.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF INVENTION

While this invention is susceptible of being embodied in many different forms, the preferred embodiment of the invention is illustrated in the accompanying drawings and described in detail hereinafter with the understanding that the present disclosure is considered to exemplify the principles of the present invention and is not intended to unduly limit the invention to the embodiments illustrated and presented herein. The present invention has particular utility as a device for furthering widespread circulation of water generally within a shallow body of water such as near the shoreline to oxygenate, prevent ice formation, and moderate the amount of growth of unwanted aquatic vegetation that may otherwise be considered unaesthetically pleasing and unhealthy to human and animal populations.

Figure 1:
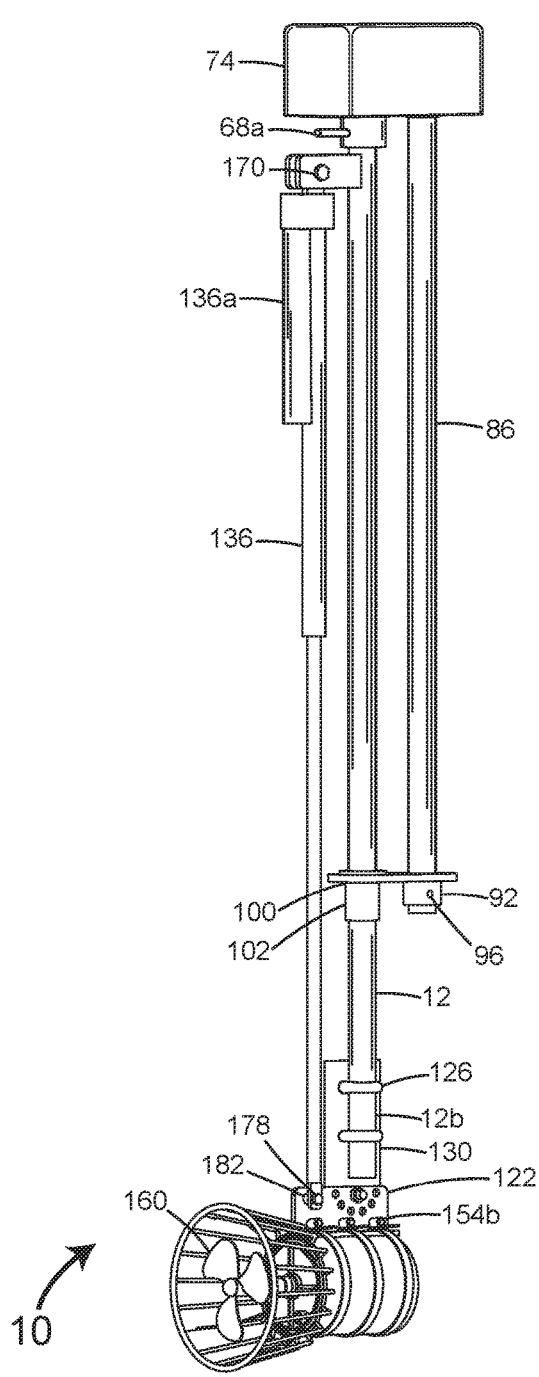
FIG. 1 is a front perspective view of the preferred embodiment of the present invention illustrating an upper assembly connecting to a lower assembly by a rotating shaft and a linear actuator.
Figure 7:
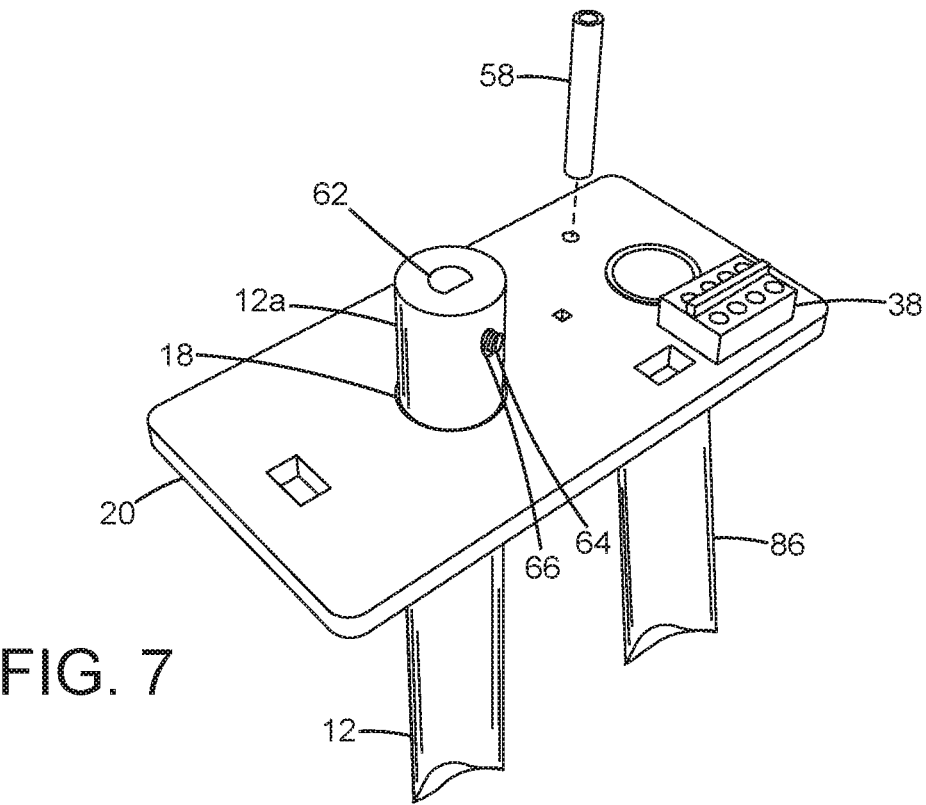
FIG. 7 is a front perspective view of the preferred embodiment of the present invention illustrating a rotating shaft extending partway through a top plate of an upper assembly.
Figure 8:
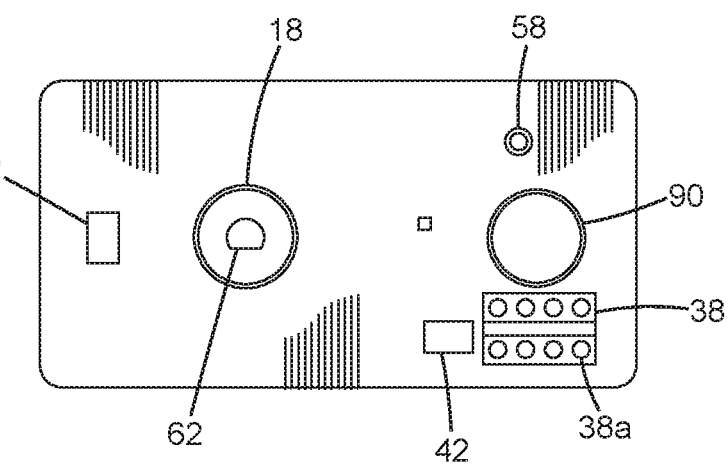
FIG. 8 is a top plan view of the preferred embodiment of the present invention illustrating a top plate configured with a mount aperture and a power terminal block.
Figure 9:
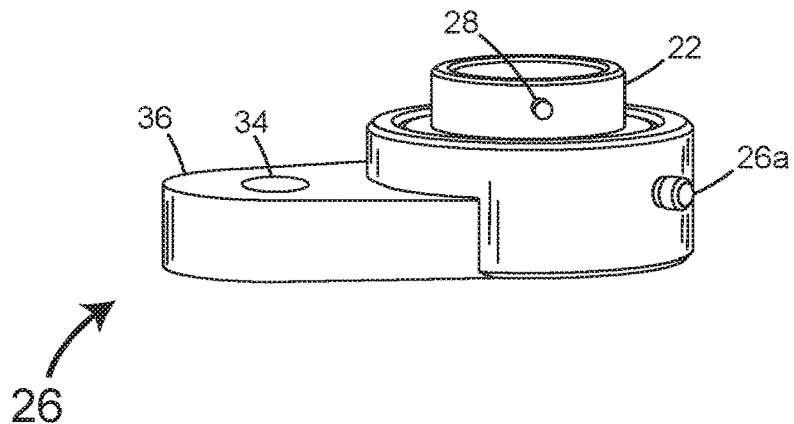
FIG. 9 is a front perspective view of the preferred embodiment of the present invention illustrating a bearing mount configured with an extended portion.
Figure 10:
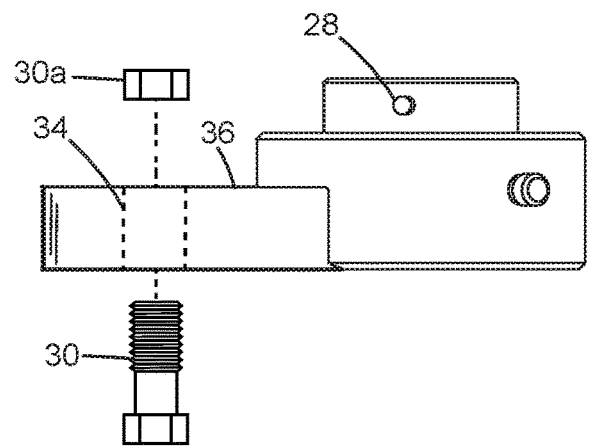
FIG. 10 is a side elevational view of the preferred embodiment of the present invention illustrating a bolt and nut assembly detached from a bearing mount.
Figure 11:
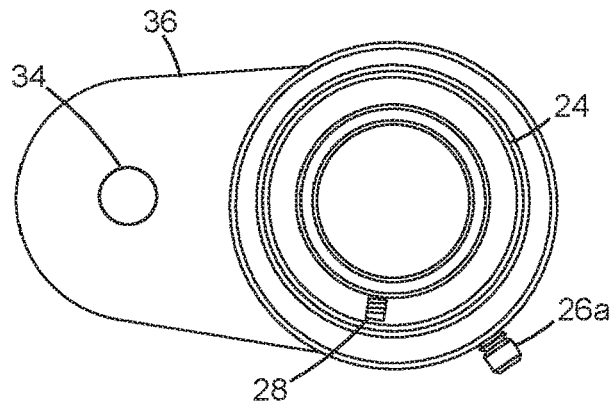
FIG. 11 is a top plan view of the preferred embodiment of the present invention illustrating a bearing mount having a bearing race and an extended portion with an aperture extending therethrough.
Figure 12:
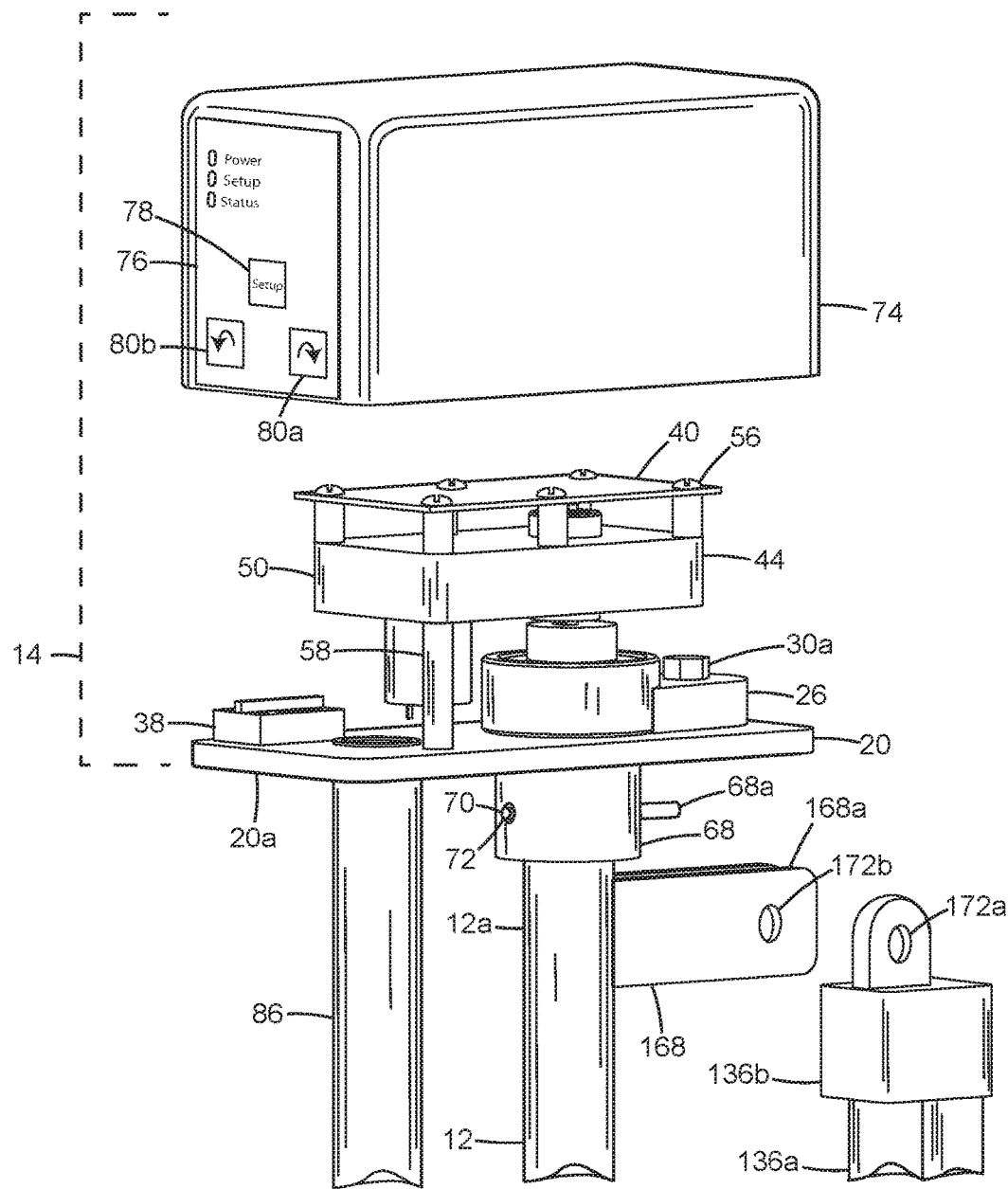
FIG. 12 is a enlarged perspective view of the preferred embodiment of the present invention illustrating an upper assembly with a box-shaped cover detached from a top plate configured with an electrical gear motor.

Reference is now made to FIG. 1 of the drawings illustrating a multipurpose blower assembly 10 for operation alongside of and attachment to a dock, walkway or an equivalent supporting structure generally present along a shoreline of a body of water. The multipurpose blower assembly 10 is specifically shown in FIGS. 1-5 as comprising a rotating shaft 12 connecting together an upper assembly 14 and a lower assembly 16, where each is respectively configured to reside above and below the water line. A first end 12a of the rotating shaft is generally illustrated in FIGS. 7 and 8 as extending into and passing through a shaft aperture 18 of a top plate 20 and terminating thereabove a predetermined amount insofar to slideably fit within the confines of a cylindrical sleeve 22 operably associated with a bearing race 24 of a bearing mount 26 of the type shown in FIGS. 9-11. A lubrication port 26a as depicted in FIG. 9 may be associated with the bearing mount to lubricate the bearing race 24 from time to time during operation. A set pin 28 threadably extending through the wall of the cylindrical sleeve serves upon its rotation to forcibly act against the outer wall surface of the rotating shaft to secure the position of the rotating shaft relatively to the bearing mount and top plate. Comparatively, as shown in FIGS. 8, 10 and 12, a bolt 30 passing through an aligned arrangement of apertures 32, 34 respectively extending through the top plate 20 and an extended portion 36 of the bearing mount and threadably affixed with a nut 30a sufficiently serves to secure the bearing mount to the top plate 20 while the rotating shaft 12 momentarily rotates from time to time during operation. Positioned atop of the top plate and accompanying the bearing mount in FIGS. 8 and 12 is a power terminal block 38 configured with a plurality of standard plug connectors 38a for accepting and connecting from an outside source a 12-volt, DC power supply and distributing power to select circuits associated with a system controller 40. A wire aperture 42 extending through the top plate adjacent to the power terminal block as shown in FIG. 8 accommodates passage of electrical wire above and into the upper assembly 14 for supplying power to the multipurpose blower assembly.

Figure 13:
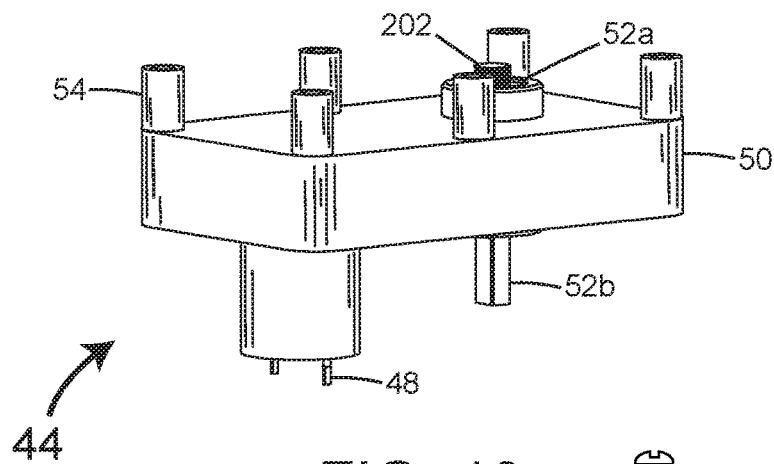
FIG. 13 is a front perspective view of the preferred embodiment of the present invention illustrating an electrical gear motor with an externally-placed electrical drive motor.
Figure 14:
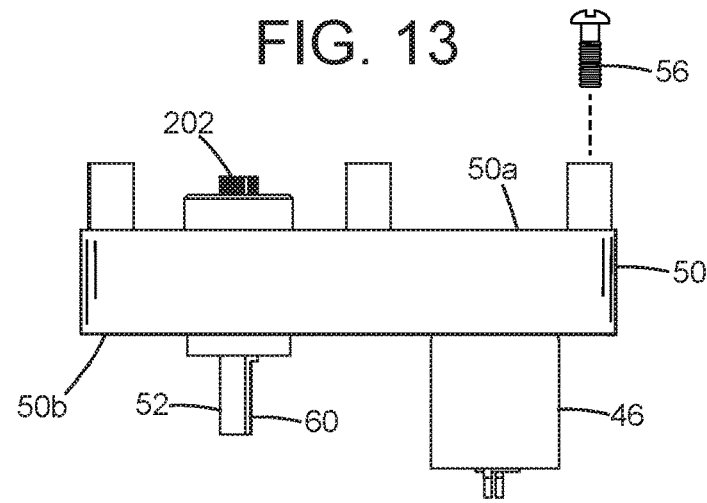
FIG. 14 is a side elevational view of the preferred embodiment of the present invention illustrating an electrical gear motor configured with an output shaft.
Figure 15:
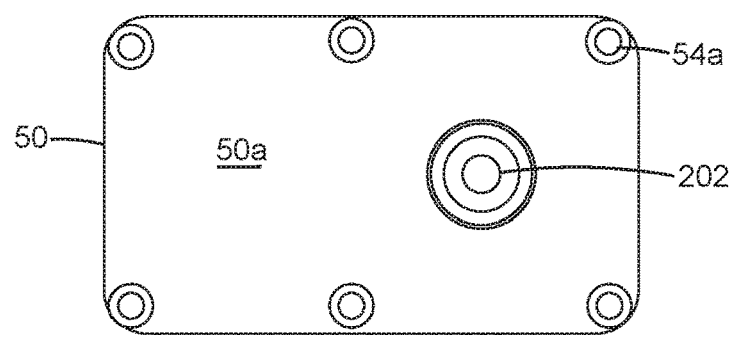
FIG. 15 is a top plan view of the preferred embodiment of the present invention illustrating an electrical gear motor having plurality of cylindrical standoffs positioned along the perimeter thereof.
Figure 16:
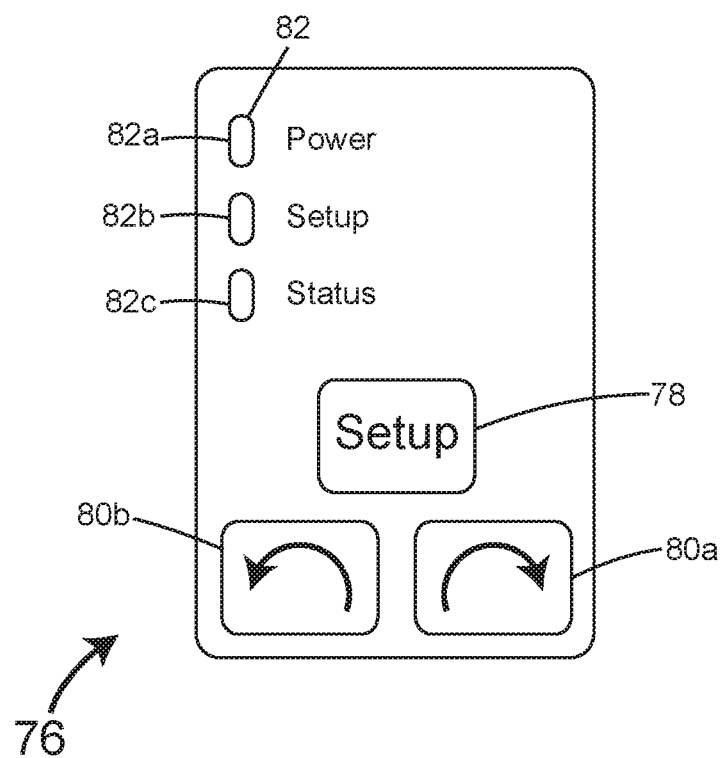
FIG. 16 is a side elevational view of the preferred embodiment of the present invention illustrating a manual interface panel having power, setup and status LEDs and setup, clockwise and counterclockwise keys.

Referring now to FIG. 12, the preferred embodiment of the multipurpose blower assembly 10 incorporates within its overall configuration an electrical gear motor 44 of the type commonly available in art as having a low gear ratio and high torque rating capable of effecting rotation of the rotating shaft 12 and connecting lower assembly 16 of significant mass within an underwater environment. One type of electrical gear motor 44 suited for this particular application, among others, is the 6000-model series as manufactured by Multiproducts Company of Racine, Wis., which is specified as nominally operating at 12 volts, 0.2 amps with a rated torque load up to 75 inch-pounds. As generally illustrated in FIGS. 13-15, the electrical gear motor 44 is supplemented with an externally-placed electrical drive motor 46 having power/ground inputs 48, gearbox 50 for housing internally a geartrain (not shown) connective to an output side (not shown) of the drive motor, and an output shaft 52 having a top end 52*a* extending partway above the top side 50*a* of the gearbox and a bottom end 52*b* extending downwardly from a bottom side 50*b* of the gearbox for engaging and connecting to the first end 12*a* of the rotating shaft 12. A plurality of cylindrical standoffs 54, each internally configured with an elongated, threaded aperture 54*a,* extend upwardly from and along the perimeter of the top side of the gearbox that serve as means for mounting the system controller 40 with screws 56 and the like such to further accessibility to select logic circuits associated with operation of the electrical gear motor 44, while a singular standoff 58 extending from the top plate 20 to the bottom side 50*b* of the gearbox in FIG. 12 and equally secured with screws serves to supplementally support the gearbox along with that of the connection of the output shaft 52 and first end 12*a* of the rotating shaft. In fulfilling a secure connection between the rotating and output shafts that effects to inhibit rotational slip, the output shaft 52 in FIG. 14 is geometrically configured with a key 60, splines or other geometry that is suited for placement within an equally configured aperture 62 of the first end of the rotating shaft of the type shown in FIG. 7, while a setscrew 64 extending into and passing through a threaded aperture 66 of the first end of the rotating shaft engages select portions of the geometric configuration of the output shaft in a manner for unifying rotation of the rotating shaft 12 with that of the output shaft 52. In supplementing securement of the rotating shaft that prevents longitudinal movement of the top end beyond that of the bearing mount 26, a collar 68 is slidably placed upon the first end of the rotating shaft and positioned in a manner to exist below a bottom side 20*a* of the top plate where it is secured thereat by a setscrew 70 extending into a threaded aperture 72 of the collar, as generally illustrated in FIG. 12. As further shown in FIGS. 2 and 12, the collar comprises an indicator pin 68*a* that generally corresponds to the direction of radial outward flow produced by the multipurpose blower assembly 10 to allow the user operator to setup and configure the correct orientation for trouble-free operation. As further depicted in FIG. 12, the upper assembly 14 is supplemented with a boxed-shaped cover 74 for encapsulating and protecting the bearing mount, electrical gear motor 44 and system controller 40 from the elements and comprises a side 74*a* for mounting input-setting means in the form of a manual interface panel 76. The manual interface panel, as particularly shown in FIG. 16, comprises a setup key 78 and clockwise (CW) and counterclockwise (CCW) keys 80*a,* 80*b* for initially configuring clockwise (CW) and counterclockwise (CCW) endpoint positions 81*a,* 81*b* of the electrical gear motor 44 and LED indicator lamps 82 to signify to the user operator certain states of operation such as activation and deactivation of power through a power LED 82*a,* setup routines through a setup LED 82*b,* and status of operation through a status LED 82*c.*

Figure 2:
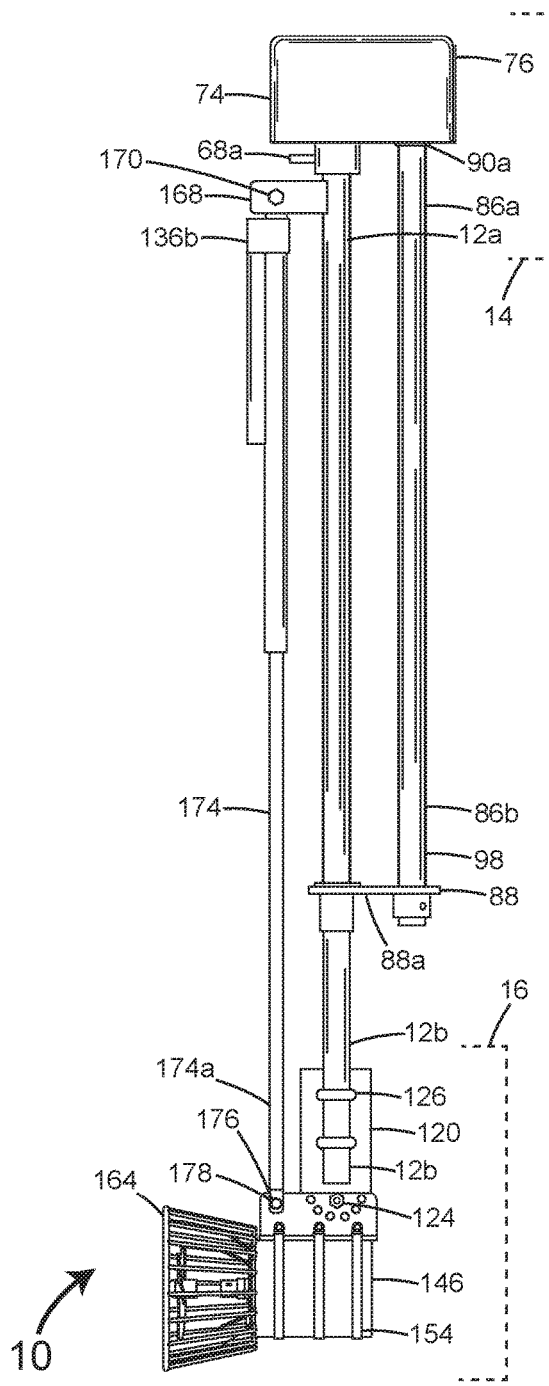
FIG. 2 is a left elevational view of the preferred embodiment of the present invention illustrating an upper assembly connecting to a lower assembly by a rotating shaft and a linear actuator.
Figure 3:
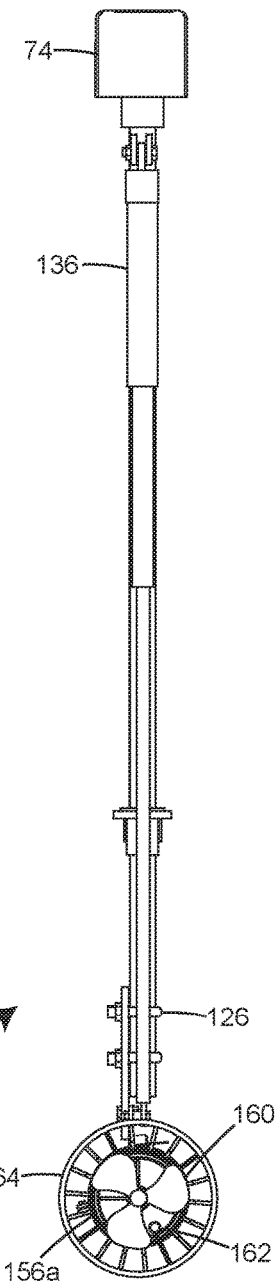
FIG. 3 is a back elevational view of the preferred embodiment of the present invention illustrating a lower assembly configured with a blower motor and a mount post connected to an upper assembly.

In supporting the upper assembly 14 above the water line, the multipurpose blower assembly 10 is further supplemented with a mount bracket 84 operating conjunctively with a mount post 86 that extends from the bottom side of the top plate and terminates at a mid-support plate 88, whereby the mount post is generally positioned to extend parallel with that of the rotating shaft 12, as typically depicted in FIG. 2. An upper end 86*a* of the mount post is preferably connected to the top plate 20 by means of fitment within an mount aperture 90 extending through the top plate with a weld bead 90*a* circumferentially placed around the union on the bottom side of the top plate. Comparatively, a lower end 86*b* of the mount post is connected to the mid-support plate through use of a collar 92 that is positioned and welded to an underside surface 88*a* of the mid-support plate. A setscrew 94 positioned within a threaded aperture 96 extending through the collar and intercepting an outer surface portion 98 of the lower end completes securement of the mount post to the mid-support plate 88. The mid-support plate is also featured with an aperture 100 that permits passage of a select portion of the rotating shaft to assist in structurally supporting and stabilizing the rotating shaft as it is connected to the lower assembly 16. A sleeve bearing 102 of the type shown in FIG. 1 may be press-fitted within the aperture of the mid-support plate such to mitigate frictional binding as the rotating shaft 12 rotates from time to time during operation.

Figure 17:
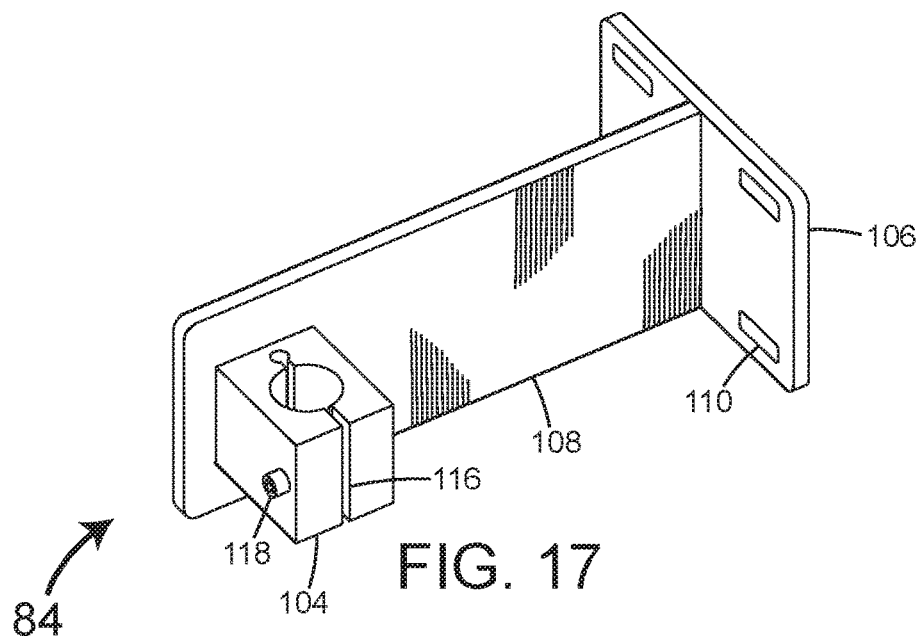
FIG. 17 is a front perspective view of the preferred embodiment of the present invention illustrating a mount bracket connecting to a compression block configured with a throughput aperture.
Figure 18:
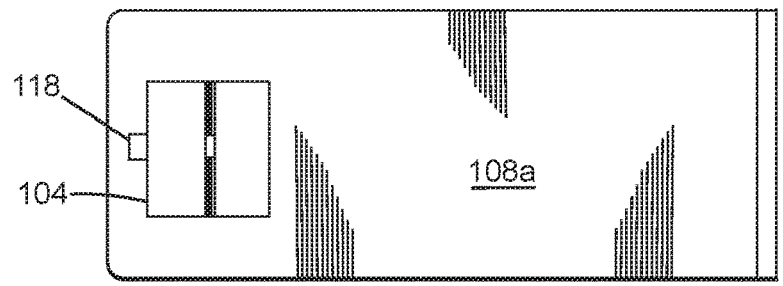
FIG. 18 is a side elevational view of the preferred embodiment of the present invention illustrating a mount bracket connecting to a compression block configured with a slot.
Figure 19:
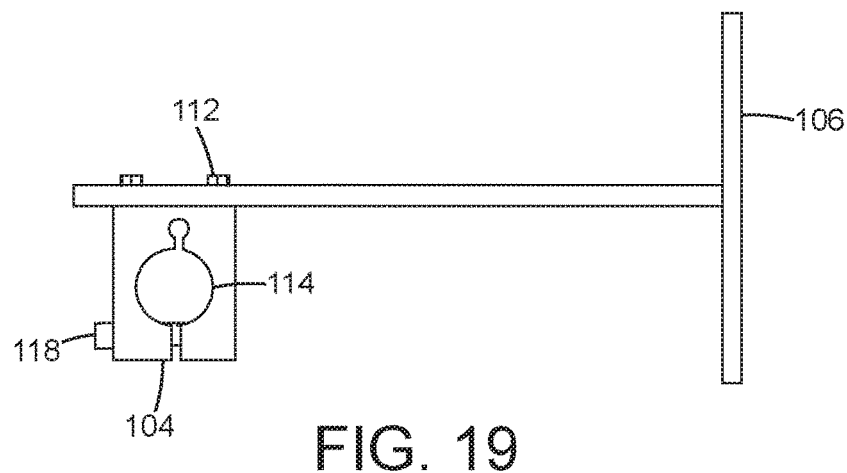
FIG. 19 is a top plan view of the preferred embodiment of the present invention illustrating a mount bracket connecting to a compression block having a throughput aperture openly communicating with a slot.

Referring now to FIGS. 17-19, the mount bracket 84 is shown as comprising a compression block 104 and a back plate 106 positioned perpendicular and connected to a cantilevered plate 108 generally forming an overall shape resembling a T. The back plate is supplemented with an elongate aperture 110 at each of its corners that serve as means for connecting the mount bracket to a sturdy structure present about and along the water body's shoreline such as a dock post or decking or an equivalent form of structure with screws, strapping materials and the like. The compression block 104 as generally depicted in FIGS. 17-19 is mounted to a surficial face portion 108*a* of the cantilevered plate with screws 112 and the like and comprises a throughput aperture 114 extending therethrough for accepting and accommodating a preselect section of the mount post. As further evident in FIG. 19, the throughput aperture is configured to openly communicate with a slot 116 insofar to allow it to collapse a relative amount around and compress a section of the mount post as a bolt 118 extending perpendicularly to and across the slot is tightened to a specified torque setting.

Figure 4:
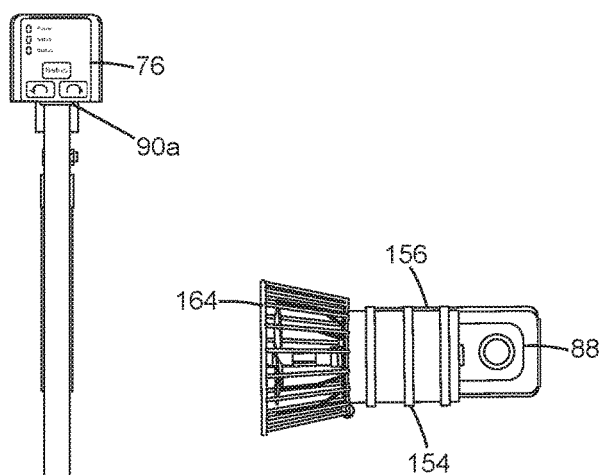
FIG. 4 is a front elevational view of the preferred embodiment of the present invention illustrating a lower assembly configured with a blower motor equipped with an impeller and a cage.
Figure 5:
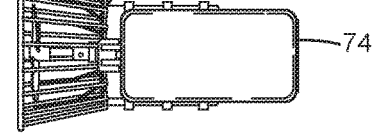
FIG. 5 is a bottom plan view of the preferred embodiment of the present invention illustrating a blower motor connected to a lower assembly.
Figure 6:
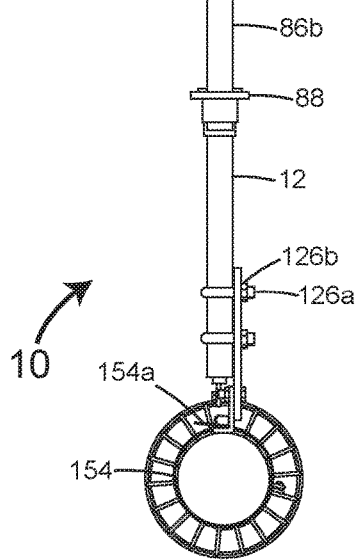
FIG. 6 is a top plan view of the preferred embodiment of the present invention illustrating an upper assembly configured with a box-shaped cover.
Figure 20:
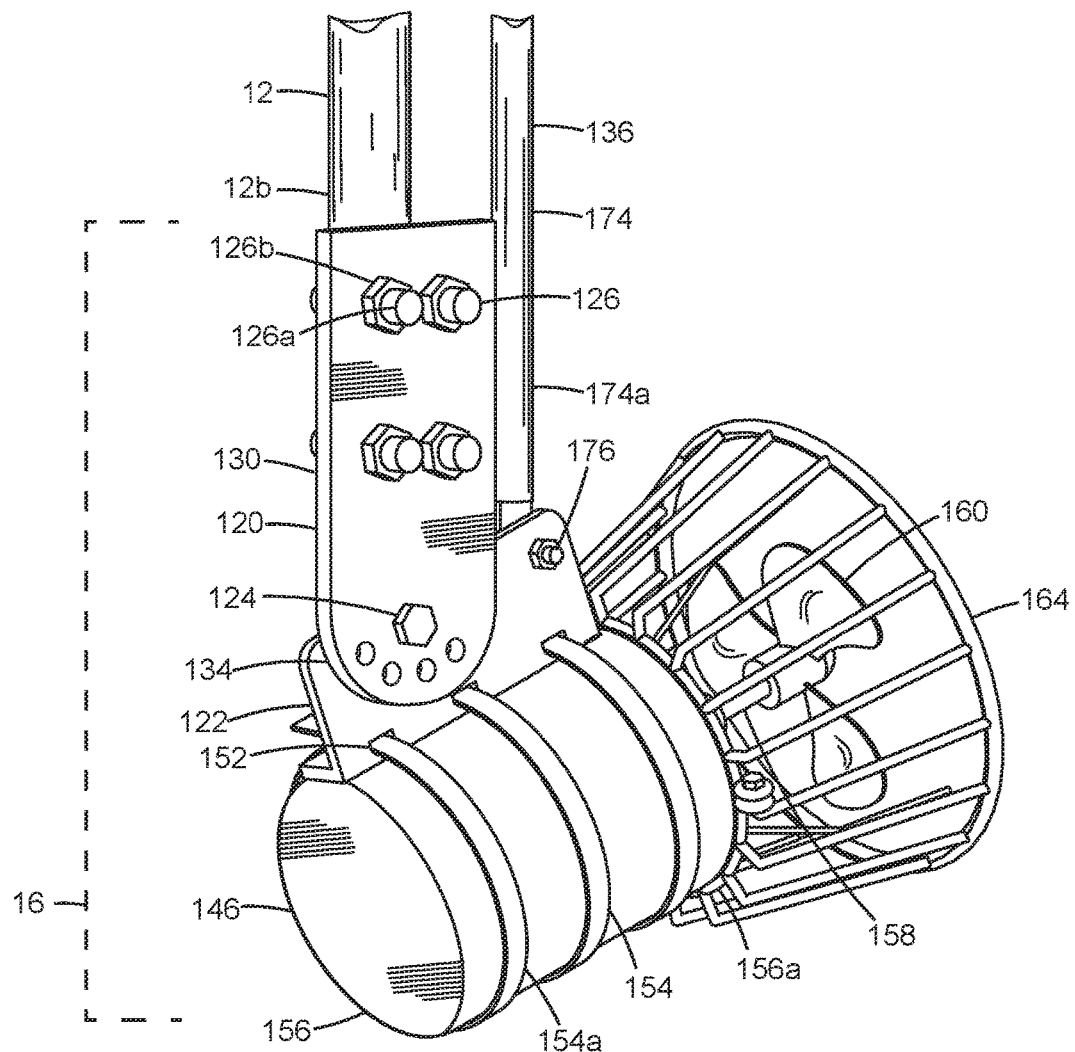
FIG. 20 is an enlarged perspective view of the preferred embodiment of the present invention illustrating a lower assembly configured with blower motor connected to a lower bracket of the lower assembly and an upper bracket connected to a rotating shaft.
Figure 21:
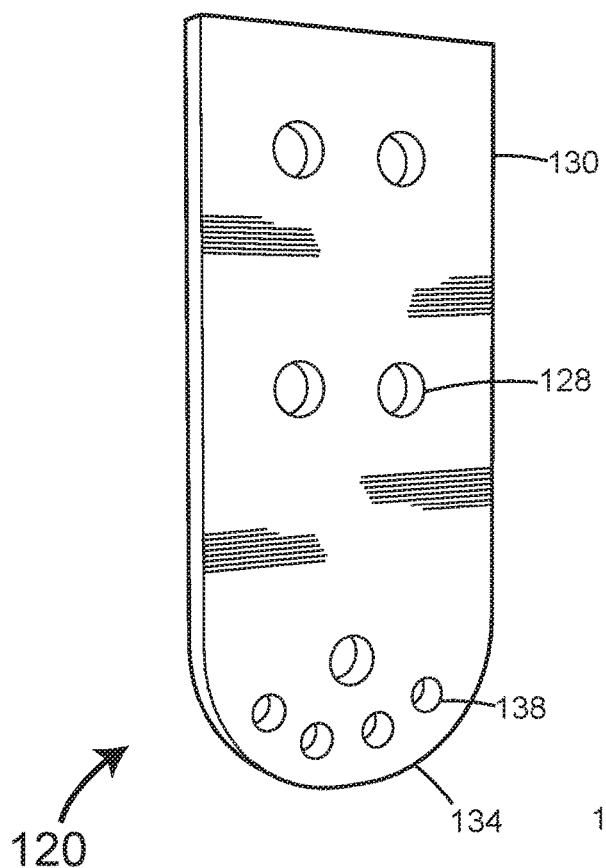
FIG. 21 is a front perspective view of the preferred embodiment of the present invention illustrating an upper bracket of a lower assembly.
Figure 22:
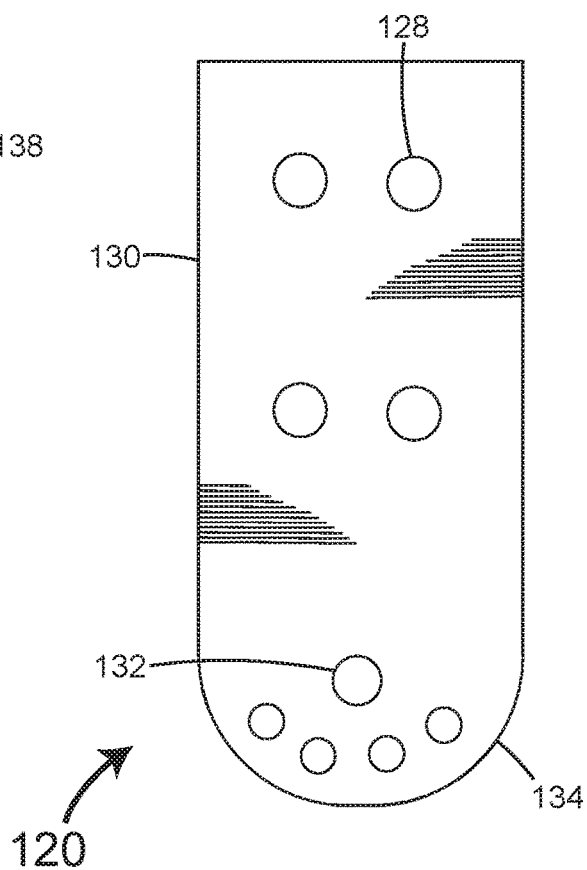
FIG. 22 is a side elevational view of the preferred embodiment of the present invention illustrating an upper bracket having a rectangular-shaped section configured with apertures for receiving therein threaded ends of U-bolts and a bottom edge of curvilinear form.
Figure 23:
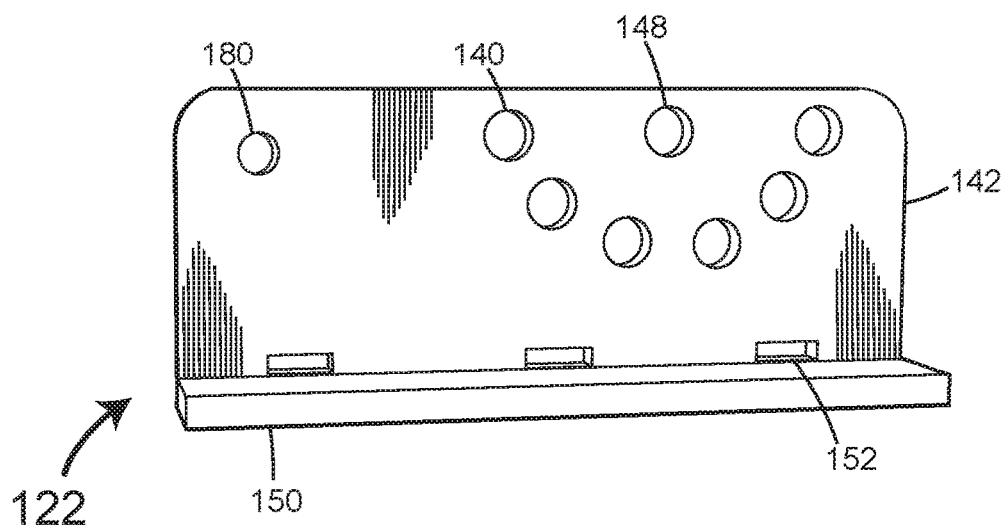
FIG. 23 is a front perspective view of the preferred embodiment of the present invention illustrating a lower bracket of a lower assembly and having a vertical plate connecting to a motor support plate.
Figure 24:
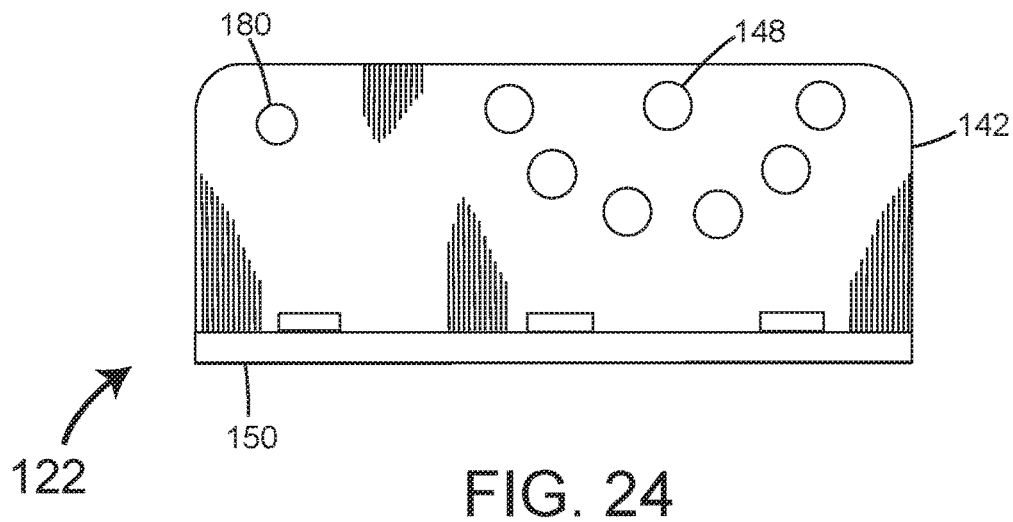
FIG. 24 is a side elevational view of the preferred embodiment of the present invention illustrating a lower bracket of a lower assembly and having a vertical plate configured with a semi-radial pattern of apertures.
Figure 25:
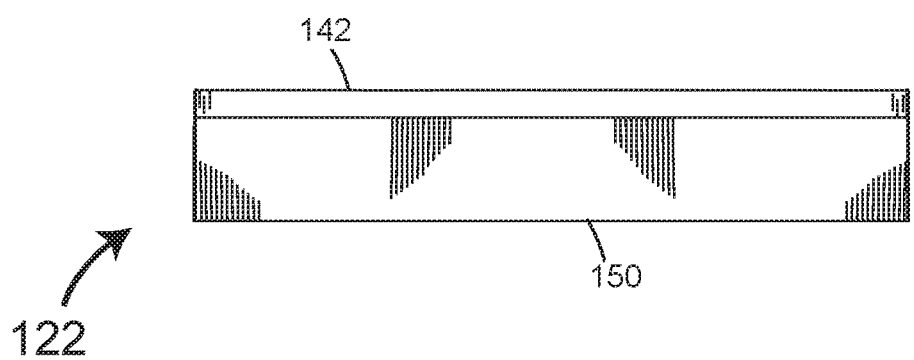
FIG. 25 is a top plan view of the preferred embodiment of the present invention illustrating a lower bracket having a vertical plate connecting to a motor support plate.
Figure 26:
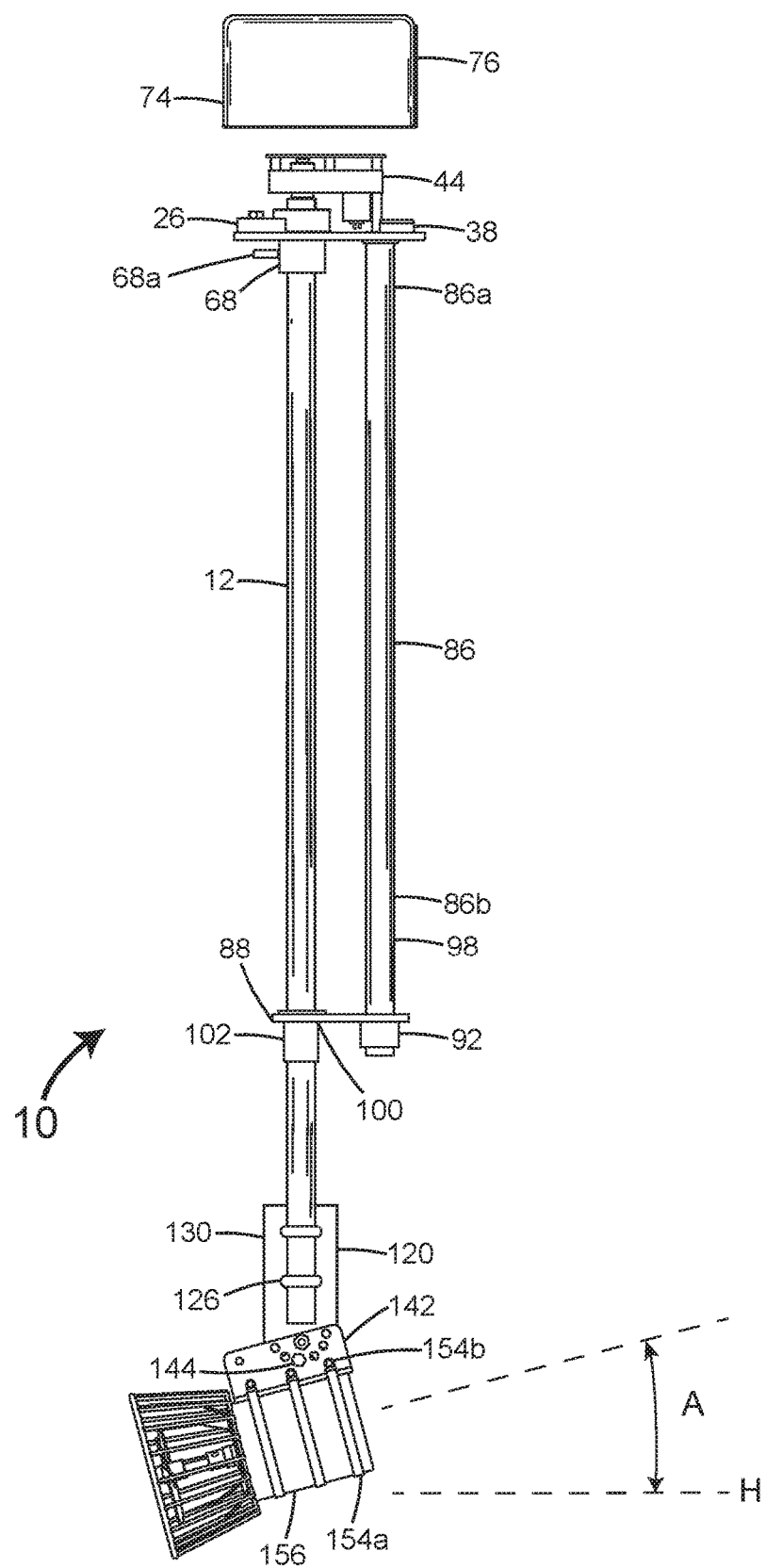
FIG. 26 is a side elevational view of the preferred embodiment of the present invention illustrating a blower motor connected to a lower assembly being angularly positioned downward along path A.
Figure 27:
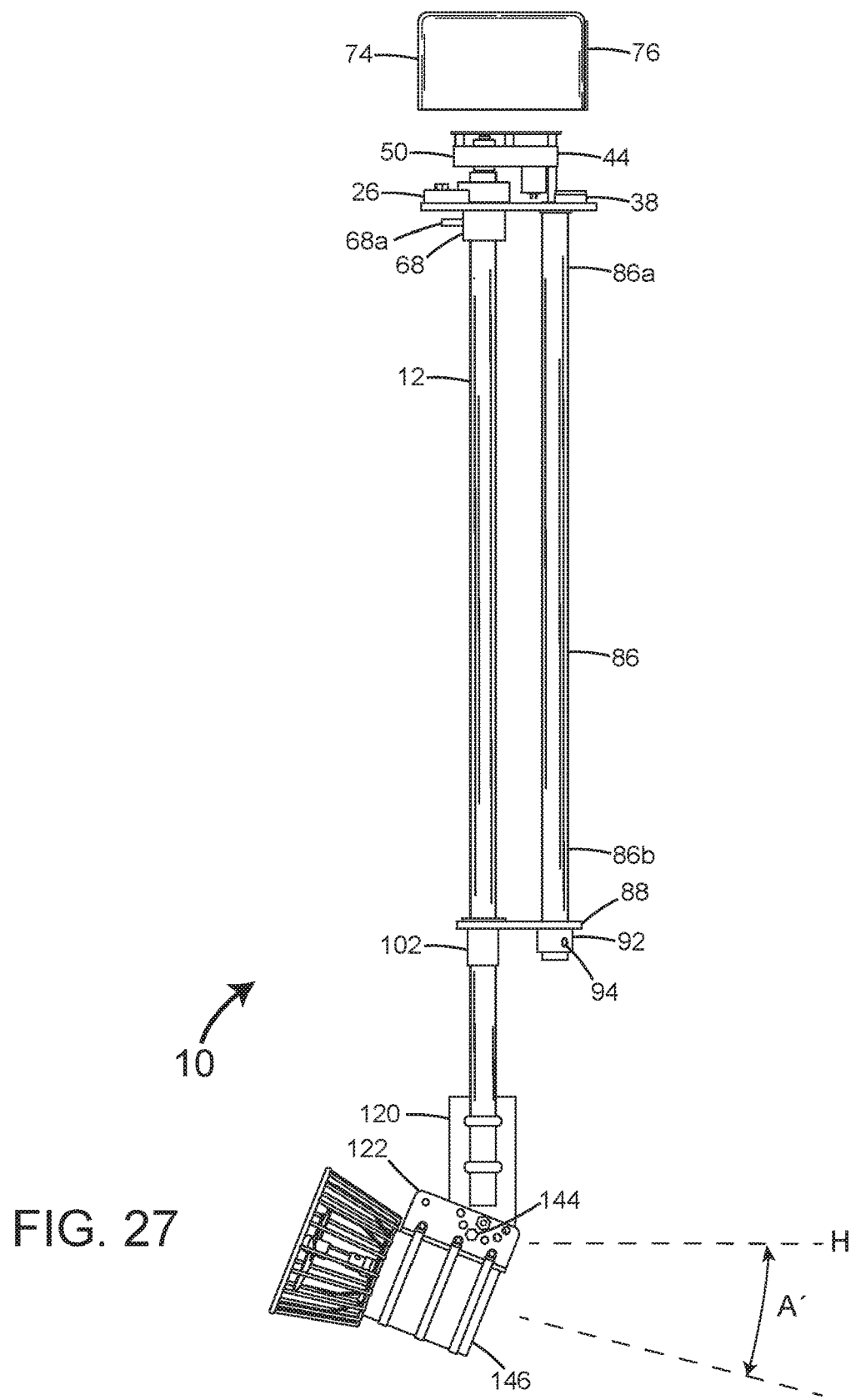
FIG. 27 is a side elevational view of the preferred embodiment of the present invention illustrating a blower motor connected to a lower assembly being angularly positioned upward along path A'.

Now in reference to FIG. 20, the lower assembly 16 is characterized in part as comprising upper and lower brackets 120, 122 that engage with and swivel relative to one another about a mount bolt 124 to effect angular tilt of the lower assembly during operation of the multipurpose blower assembly 10. The upper bracket, as particularly shown in FIG. 20, is mounted to a second end 12*b* of the rotating shaft 12 by means of a pair of U-bolts 126 that encompass and circumferentially engage around the lower end whereby threaded ends 126*a* of the U-bolts pass through an equal number of apertures 128 extending through a rectangular-shaped section 130 of the upper bracket and are affixed thereat with nuts 126*b*. The upper bracket is further characterized in FIGS. 21-22 as comprising an aperture 132 to accommodate placement of the mount bolt 124 and a bottom edge 134 of curvilinear form to afford a sufficient amount of clearance between the upper and lower brackets as each is angularly rotated relative to one another, whether it be by manual manipulation or automated manipulation through use of a linear actuator 136. Near and along the bottom edge of the upper bracket is a semi-radial pattern of apertures 138 generally offsetting from and corresponding to the curvilinear form shown in FIG. 21, whereby at least one aperture thereof is capable of aligning with an aperture from a semi-radial pattern of apertures 140 extending through a vertical plate 142 of the lower bracket 122, as typically shown in FIGS. 23-25. Accordingly, with this configuration and where manual manipulation is exercised to rotate and position the upper and lower brackets relative to one another, a bolt and nut assembly 144 effects to secure a predetermined angular relationship of the upper and lower brackets that ultimately establishes a corresponding angular relationship of a blower motor 146 relatively along path A or A', respectively above or below horizontal axis H, as primarily shown in FIGS. 26-27. Supplementing the configuration of the vertical plate 142 of the lower bracket is an aperture 148 that aligns with the aperture 132 of the upper bracket to accommodate placement of the mount bolt 124 insofar to serve as a pivot point between the upper and lower brackets and a motor support plate 150 that integrally connects to and generally extends perpendicularly outward from the vertical plate, typically in the manner depicted in FIG. 20. In supporting the blower motor 146 in the manner illustrated in FIG. 20, the vertical plate 142 comprises a plurality of elongate apertures 152 positioned in an equally spaced relation near and along the union of the vertical and motor support plates to accommodate passage of an equal number of screw straps 154. Each screw strap's extended planar section 154a is configured to simultaneously pass through the elongate aperture and encompass and engage around a motor housing 156 whereby tightening each screw head 154b of the screw strap effects to compress and firmly hold the blower motor relative to the lower bracket 122 of the lower assembly 16 as in FIG. 26. FIGS. 4 and 20 illustrate the typical configuration of the blower motor relative to the lower assembly and preferably comprises standard features typically offered in the art, including an output shaft 158 equipped with an impeller 160, a waterproof power input plug connector 162, and a cage 164 connecting to and extending outwardly from an end portion 156a of the motor housing for protecting the impeller from engaging submergible, floatable objects and the like within the water body. Although numerous types of blower motors may be suited for this direct application, the preferred embodiment of the multipurpose blower assembly 10 incorporates within its configuration a blower motor 146 having a nominal power output rating of at least ½ HP and operating at 110 volts and capable of being operated within an underwater environment for an indefinite amount of time without undue leakage. One type of blower motor meeting this specification is Model No. 3400D offered by the Kacso Company of Prescott, Wis. Other blower motors with water-resistant capabilities and having a power rating up to 1 HP and operating at either 12, 110 or 220 volts or a power rating of 2 HP and operating at 220 volts may be equally used in this capacity. It is understood within the context of this disclosure that the blower motor 146 is supplied with power of 12, 110 or 220 volts from an outside source apart from the multipurpose blower assembly 10, where power on/off switching capabilities associated therewith may reside apart from or made part of select circuitry of the system controller 40.

Referring now to FIG. 2, the linear actuator 136 possesses the capabilities of moving the blower motor upward and downward automatically at specified radial positions and time intervals through use of select logic circuitry associated with the system controller and may be used in lieu of manual manipulation of the lower bracket 122 to achieve the desired angular tilt of the blower motor, which relies on usage of the bolt and nut assembly 144 and semi-radial pattern of apertures 138, 140 to secure the angular relation of the upper bracket 120 relative to the lower bracket 122. In fulfilling this alternative or optional configuration, the linear actuator is shown in FIG. 12 as comprising a body portion 136a with an upper end 136b connecting to a pair of outwardly extending plates 168 that are attached relatively about the first end 12a of the rotating shaft 12. A bolt 170 passing through an aligned set of apertures 172a, 172b respectively extending through the upper end 136b of the linear actuator and free ends 168a of the outwardly extending plates fulfills to secure the linear actuator 136 to the upper assembly 14 in the manner depicted in FIG. 2. As shown in FIGS. 2 and 20, the linear actuator is supplementally configured with a tie rod 174 having an end 174a mounted to the vertical plate by means of a bolt 176 that simultaneously passes into an aperture 178 extending through the tie rod end and an aperture 180 extending through the vertical plate generally adjacent to the location where the cage 164 attaches to the motor housing 156. Before establishing connection of the tie rod end, an offsetting sleeve 182 may be situated in between the vertical plate and tie rod end to establish an overall vertical, parallel orientation of the linear actuator 136 relative to the rotating shaft 12 while the blower motor 146 is held in a neutral, horizontal position, typically in the manner shown in FIG. 1.

Figure 28:
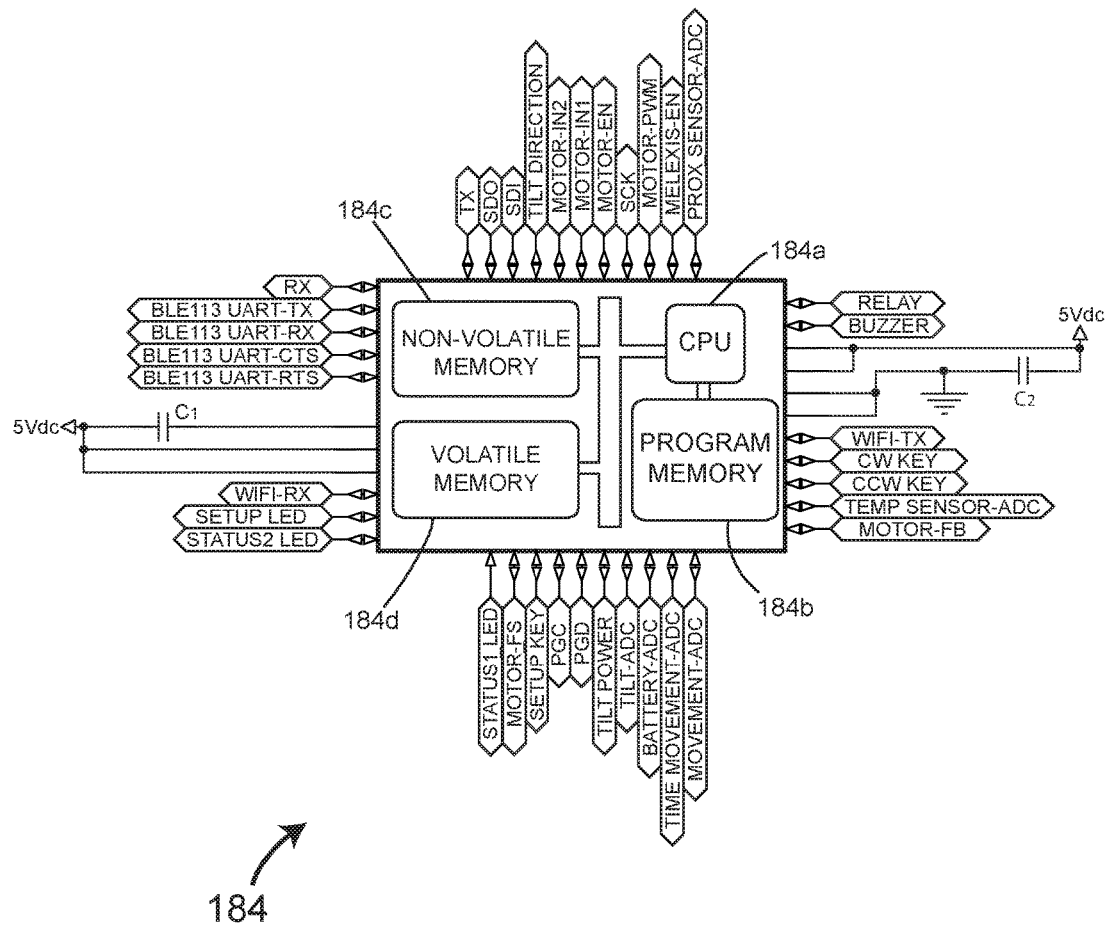
FIG. 28 is a schematic diagram of a microcontroller integrated within a system controller.

Now in reference to FIGS. 28-32 and 34-46, the multipurpose blower assembly 10 comprises a number of logic circuits integrated within the system controller 40 and communicatively coupled to a microcontroller 184. The microcontroller in FIG. 28 is shown as conventionally comprising a central processing unit (CPU) 184a with onboard capabilities of decoding and executing a programmable instruction set written to and residing in a program memory module 184b for operably controlling comprehensive functionality of the electrical gear motor 44 and linear actuator 136, for example; a non-volatile memory module preferably in the form of electrically erasable programmable read-only memory (EEPROM) 184c for storing user operator settings as well as other input variables generated by the programmable instruction set, and a volatile memory module preferably in the form of random access memory (RAM) 184d for temporary storage of variables for computational processing by the CPU. Although numerous types and configurations of microcontrollers may be applicably suited in fulfilling the utilitarian objectives set forth herein, the multipurpose blower assembly 10 preferably incorporates within its configuration a 44-pin flash microcontroller of the type having an array of onboard capabilities and flexibility in terms of the number of configurable input/outputs available for coupling and controlling the logic circuits set forth herein. Microcontrollers manufactured and offered by the Microchip Company of Chandler, Ariz., for example, generally serve to fulfill the operating requirements of the multipurpose blower assembly. As further associated with the system controller, a number of resistors $R_1$-$R_{30}$ and capacitors $C_1$-$C_{25}$ are incorporated within the overall design of each of the logic circuits, respectively to limit current flows through the circuits and suppress high-frequency noise in the power supply signals, generally of the form of tiny voltage spikes or ripples that may otherwise cause harm to the delicate circuitry forming the microcontroller as well as the individual logic circuits set forth herein.

Figure 29:
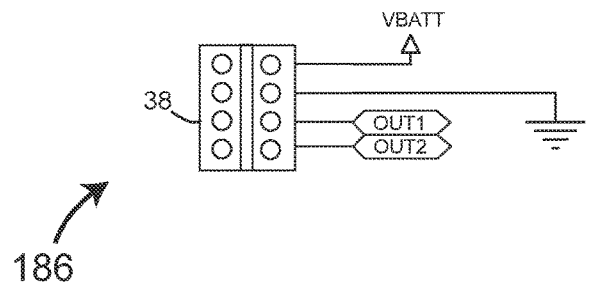
FIG. 29 is a schematic diagram of a power distribution circuit integrated within a system controller.
Figure 30:
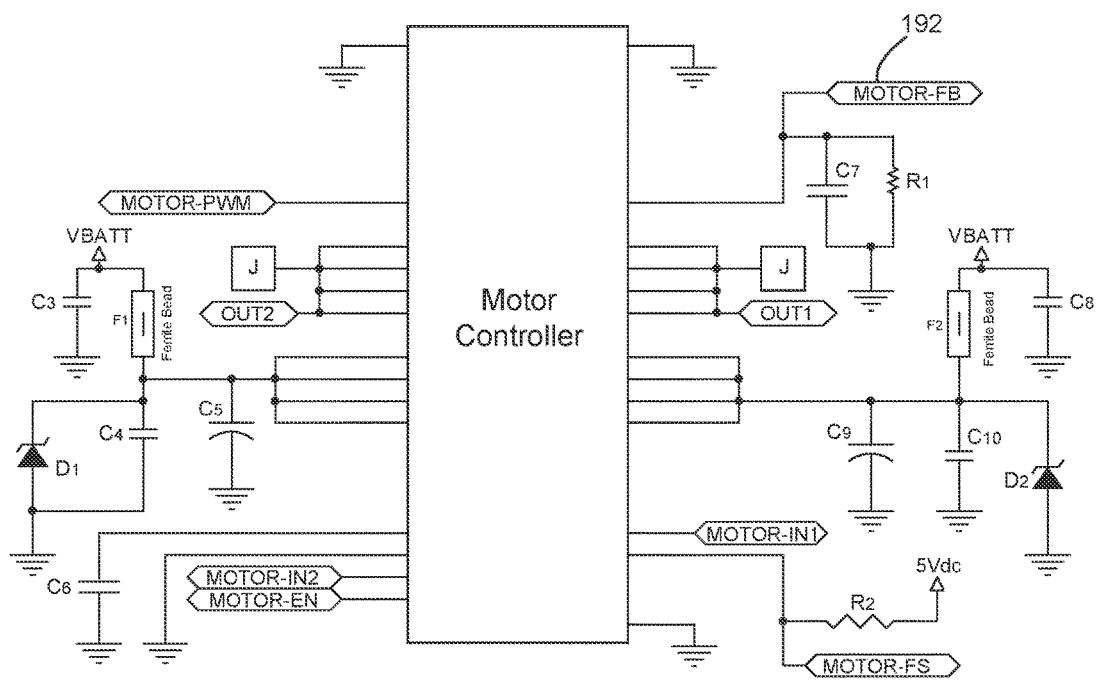
FIG. 30 is a schematic diagram of a motor controller in the form of an H-bridge circuit integrated within a system controller.
Figure 31:
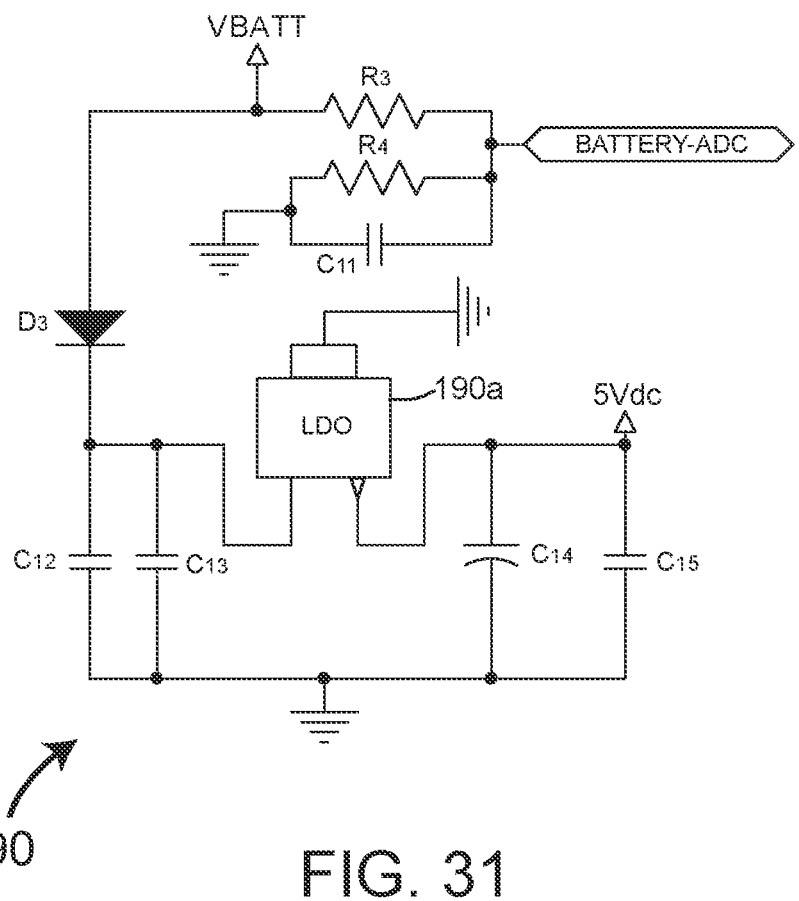
FIG. 31 is a schematic diagram of a regulator circuit integrated within a system controller.

As schematically represented in FIG. 29, power is initially supplied to a power distribution circuit 186 from an outside 12 volt power supply via the power terminal block 38 mounted to the top plate 20 and distributed therefrom to a motor controller 188 in the preferential form of a H-bridge circuit in FIG. 30 through connectors OUT1 and OUT 2 where power of 12 volts can be supplied to the drive motor 46 of the electrical gear motor 44 and to a regulator circuit 190 through connector VBATT as schematically represented in FIG. 31, as well as other onboard logic circuitry. Besides developing, filtering and serving to regulate power at 5 volts for distribution to the logic circuits associated with the system controller, the regulator circuit 190 in FIG. 31 connects to the microcontroller 184 through connector BATTERY-ADC to enable monitoring of the supplied voltage in view of a voltage set point and primarily regulates the voltage through use of a low-dropout voltage (LDO) regulator 190a, which advantageously protects the individual logic circuits from power surges caused by lightening strikes, electrical shorts, ground faults, and the like.

As generally shown in FIG. 30, the motor controller 188 as represented by the H-bridge circuit is mainly directed to controlling operative functionality of the electrical gear motor in terms motor speed through connector MOTOR-PWM (pulse width modulator), motor direction (reverse and forward) through connectors MOTOR-IN1 and MOTOR-IN2, and motor state through connector MOTOR-EN, as collectively coupled to the microcontroller under each of their respective designations. In further respects, the H-bridge circuit comprises protective circuitry in the form of a motor feedback loop 192 that is configured to monitor in real time the electrical current passing into and through the electrical gear motor 44 as a safeguard measure in preventing overcurrent conditions that may otherwise damage the electrical gear motor and associated connected circuits, which is afforded by connector MOTOR-FB coupled to the microcontroller 184, and fault status, as represented by connector MOTOR-FS coupled to the microcontroller, that monitors the status of the electrical gear motor 44 in relation to over- and under-voltage and over thermal conditions that may adversely affect continued operation of the electrical gear motor under its current, unsafe state.

Figure 32:
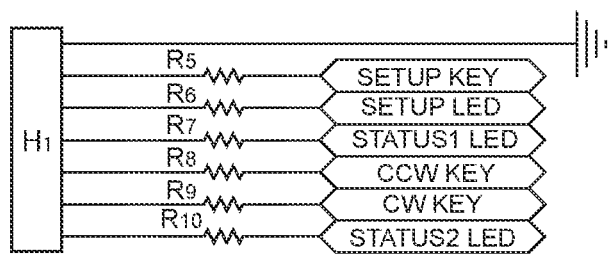
FIG. 32 is a schematic diagram of a control interface circuit integrated within a system controller for electrically coupling the manual interface panel with that of a microcontroller.

As indicated in FIG. 32, the system controller 40 is supplemented with a control interface circuit 76a having header $H_1$ for electrically coupling the manual interface panel 76 with that of the microcontroller under designated connectors, where connectors SETUP KEY, CW KEY and CCW KEY are respectively associated with the setup key 78 and the clockwise (CW) and counterclockwise (CCW) keys 80a, 80b to enable the user operator to set the CW and CCW endpoint positions 81a, 81b for storage into EEPROM and processing by the CPU in accord with the programmable instruction set, whereas connectors SETUP LED, STATUS1 LED and STATUS2 LED are associated with the power, setup and status LEDs 82a, 82b, 82c to enable visual display to the user operator through the manual interface panel of select configurations and settings, error conditions, operational interrupts, and so forth developed by the microcontroller.

Figure 33:
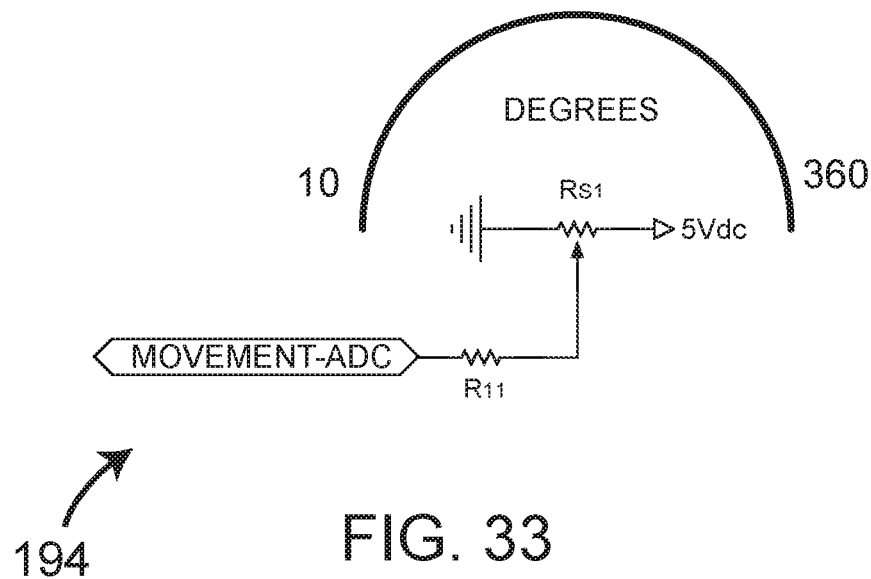
FIG. 33 is a schematic diagram of a radial movement control circuit configured with a first potentiometer integrated within a system controller.
Figure 34:
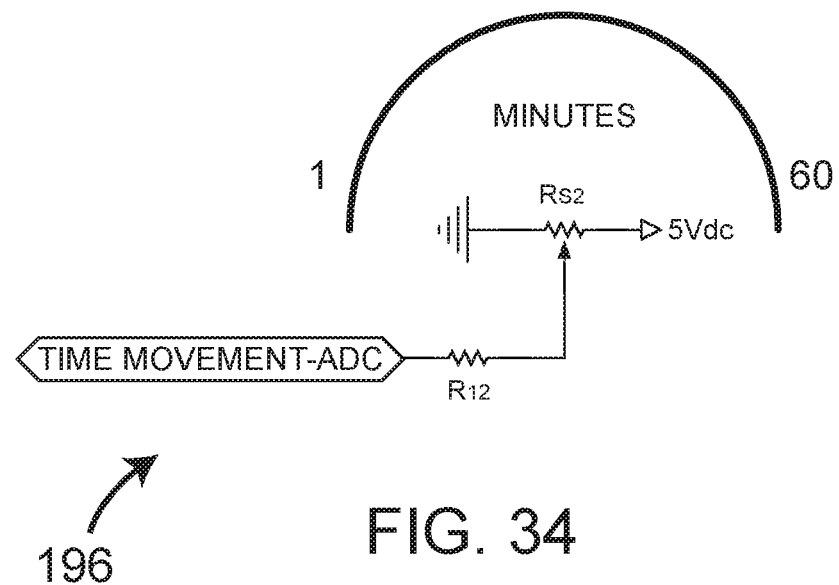
FIG. 34 is a schematic diagram of a momentary idle time circuit configured with a second potentiometer integrated within a system controller.
Figure 35:
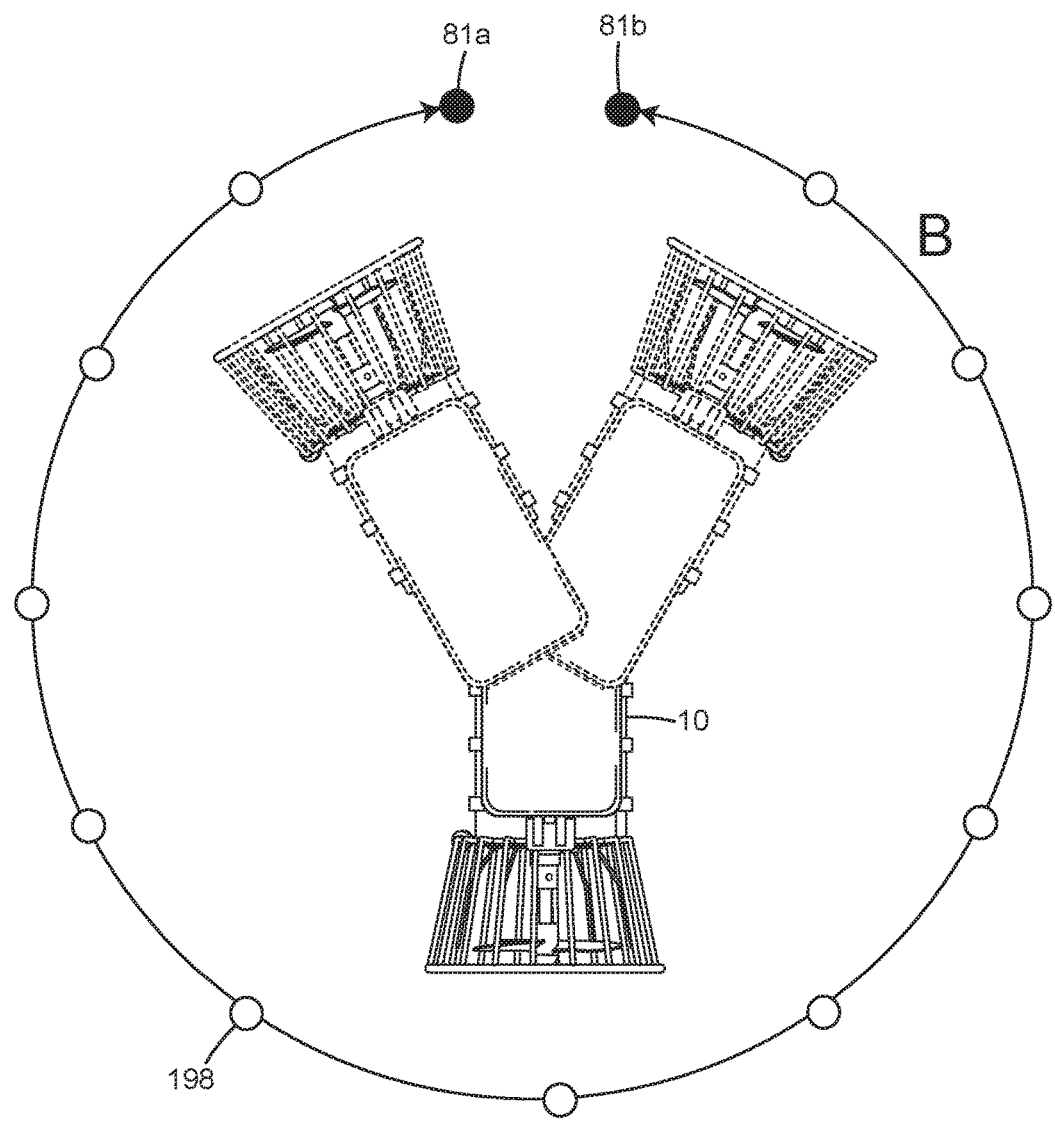
FIG. 35 is a schematic view of the preferred embodiment of the present invention illustrating radial motion of a blower motor along path B with designation of multiple positions of a radial increment of movement along thereof.

In providing controlled operation of the electrical gear motor, the system controller 40 is further featured in FIGS. 33-34 with a radial movement control circuit 194 and a momentary idle time circuit 196 respectively comprising a first potentiometer ($Rs_1$) directed in manually setting a radial increment of movement 198 of the lower assembly 16 from within a range of 10 to 360 degrees, as exemplarily shown as multiple positions along path B in FIG. 35, and a second potentiometer ($Rs_2$) directed in manually setting a momentary idle state from one to sixty minutes by which the output shaft of the electrical gear motor remains idle after advancing to each radial increment of movement 198 along path B. FIG. 28 represents connection of the first and second potentiometers $Rs_1$, $Rs_2$ to the microcontroller 184 respectively through connectors MOVEMENT-ADC and TIME MOVEMENT-ADC, whereby variable analog voltage inputs generated by the potentiometers are converted to digital form through the onboard analog/digital convertor (ADC) and processed by the microcontroller in accord with the programmable instruction set and delivered to the motor controller 188 or H-bridge circuit in FIG. 30 to accordingly execute the desired functionality of the electrical gear motor 44 based on the user operator inputs.

Figure 36:
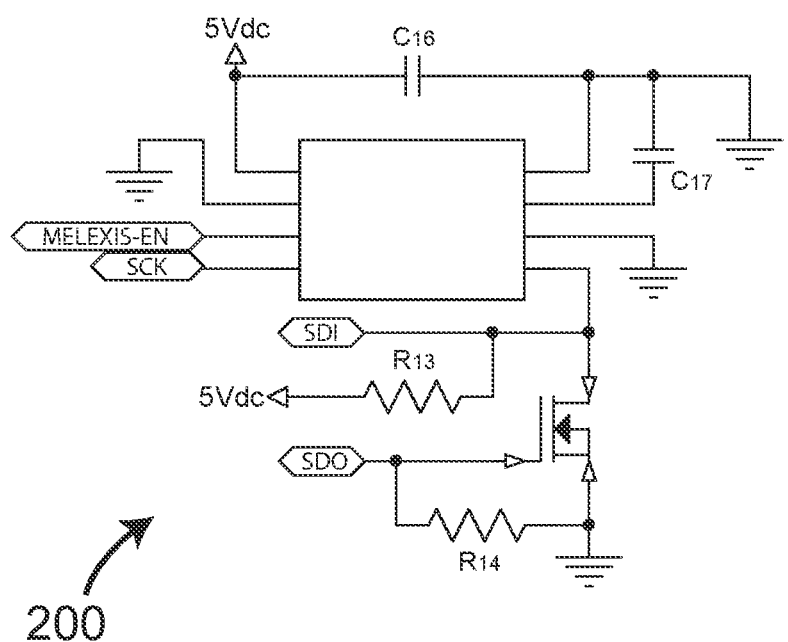
FIG. 36 is a schematic diagram of a position sensor circuit integrated within a system controller.

As schematically represented in FIG. 36, the system controller 40 is further supplemented with a position sensor circuit 200 that monitors in real time the radial or rotary position of the output shaft 52 of the electrical gear motor 44 for communication with the microcontroller, where connectors SDO (serial peripheral data interface output), SDI (serial peripheral data interface input), SCK (serial peripheral data interface clock output), MELEXIS-EN provide connective means of two-way communication with the microcontroller via input and outputs ports using serial protocol. Although any number of rotary position sensors available in the art may be adequate to serve in this capacity, the multipurpose blower assembly 10 preferably incorporates within its configuration a non-contact type of sensor in the form of a magnetic position sensor that relies on the use of a magnet 202 attached to the top end 52a of the output shaft of the electrical gear motor shown in FIG. 13 and is read from time to time by an integrated circuit (IC) integrated within the system controller 40 and existing above the magnet. One type of rotary position sensor most useful in fulfilling the requirement of the multipurpose blower assembly is from the model series MLX90316 offered and manufactured by Melexis Technologies NV based in Tessenderlo, Belgium.

Figure 37:
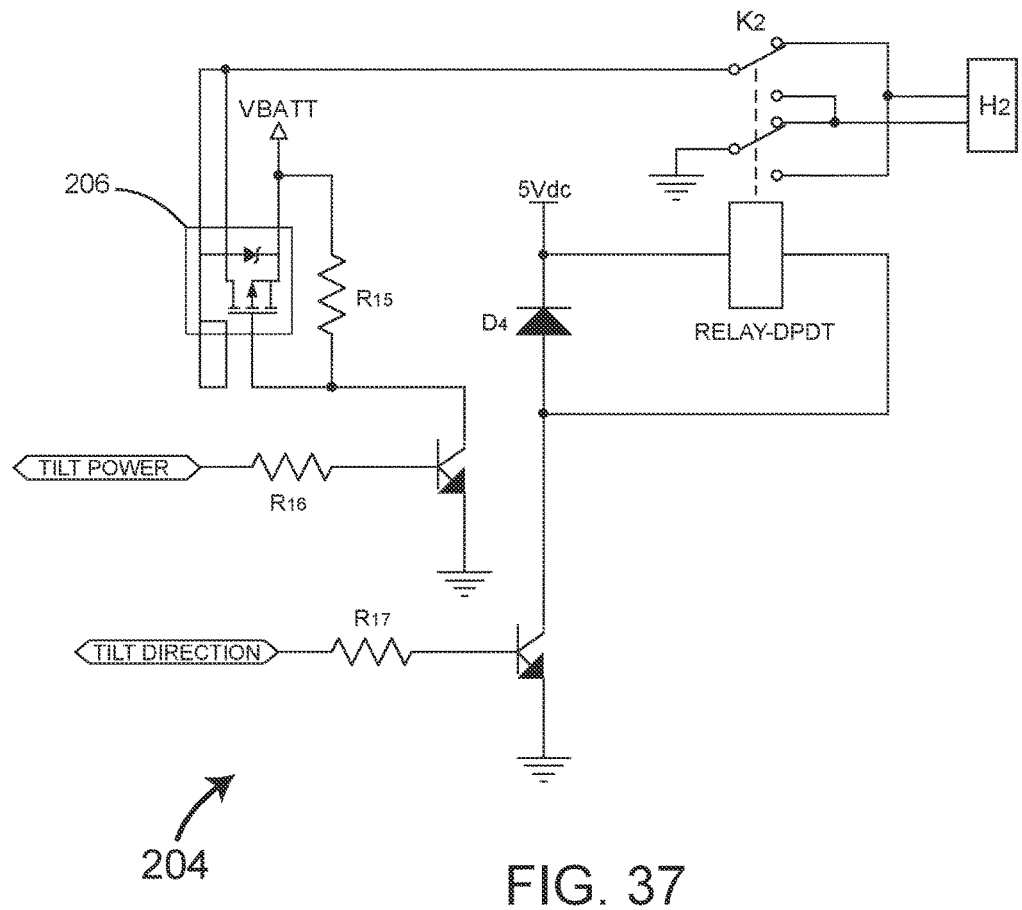
FIG. 37 is a schematic diagram of a tilt control circuit integrated within a system controller.
Figure 38:
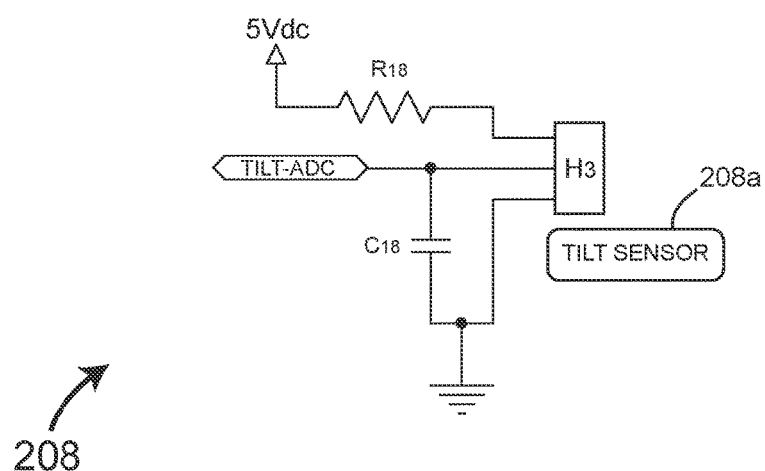
FIG. 38 is a schematic diagram of a tilt feedback circuit integrated within a system controller and having a tilt sensor.

In controlling operation of the linear actuator 136 in the preferred manner set forth herein, the system controller 40 is supplemented with a tilt control circuit 204 of the type shown in FIG. 37, which is communicatively coupled to the microcontroller 184 through connector TILT POWER that serves to regulate power to the linear actuator through the onboard power management switching circuit 206 that is supplied with 12 volts through header $H_2$ and controlled by a high voltage relay $K_2$ and through connector TILT DIRECTION that serves to effect upward and downward stroke movement of the tie rod 174 of the linear actuator based on user operator inputs stored in EEPROM. The tilt feedback circuit 208 as shown in FIG. 38 operates conjunctively with the tilt control circuit 204 in reading in real time the linear position of the linear actuator 136 using a tilt position sensor 208a that electrically connects to the linear actuator through header $H_3$ and is communicatively coupled to the microcontroller through connector TILT-ADC.

Figure 39:
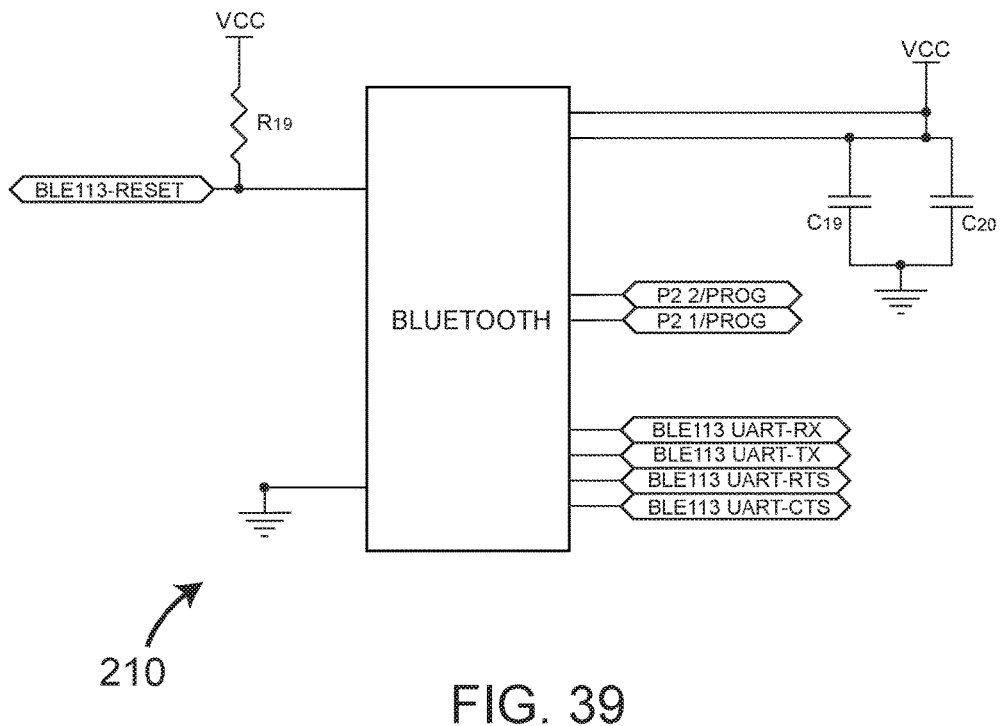
FIG. 39 is a schematic diagram of a Bluetooth circuit integrated within a system controller.
Figure 40:
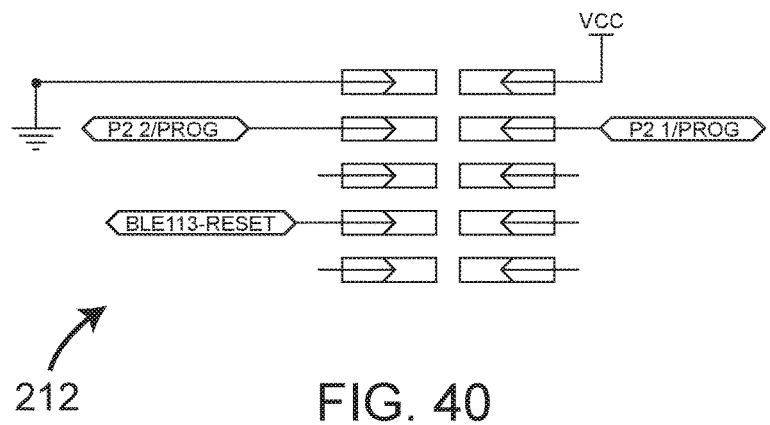
FIG. 40 is a schematic diagram of a programming circuit for programming a Bluetooth circuit integrated within a system controller.

As a supplemental or an alternative form of input-setting means for making user operator inputs for storage in EEPROM to control select functionality of the electrical gear motor and linear actuator in addition to or in lieu of the manual inputs made thorough the manual interface panel 76, the system controller is configured with wireless operating means in the form of a Bluetooth circuit 210 of the type shown in FIG. 39 to include therewithin a low energy module to enable connectivity to computers, mobile devices or other electronic devices (not shown) apart from the multipurpose blower assembly 10 with controlled operability thereof using an interfacing software application installed on the electronic device. In particular, the Bluetooth circuit in FIG. 39 is communicatively coupled to the microcontroller in FIG. 28 through connector BLE113 UART RX that serves to receive serial inputs, connector BLE113 UART TX that serves to transmit serial outputs, connector BLE113 UART RTS that serves as a request to send serial outputs, and connector BLE113 UART CTS that serves to clear send inputs. As shown in FIG. 40, control settings for the Bluetooth circuit is made by way of a programming circuit 212 that communicatively operates therewith but is not integrated within the logic circuitry of the system controller such to allow user setting inputs that coincide with the desired scope of operability offered by the interfacing software application, whereby the Bluetooth circuit 210 and programming circuit 212 are communicatively coupled together through connectors P1 2/PROG and P2 2/PROG that serve as programmable read/write ports and connector BLE113 RESET that serves to clear or reset programmable setting inputs.

Figure 41:
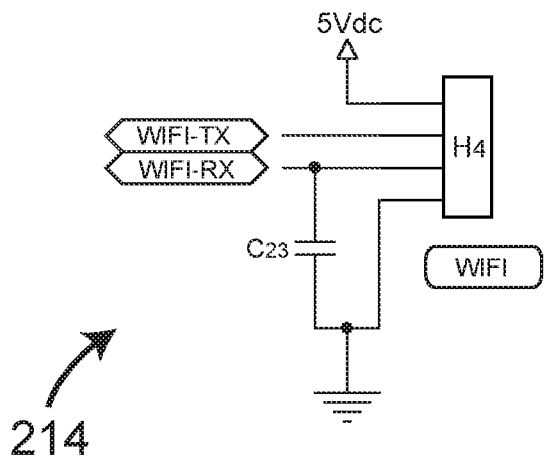
FIG. 41 is a schematic diagram of a WIFI circuit integrated within a system controller.

In supplementing the Bluetooth circuit as wireless means for controlling operation of the multipurpose blower assembly 10, the system controller contemplates use of a WIFI circuit 214 communicatively coupled to the microcontroller 184 through connector WIFI-TX that serves to transmit serial outputs and connector WIFI-RX that serves to read serial inputs, as primarily shown in FIG. 41. It is conceivable within the scope of this disclosure that wireless connectivity in the form of Bluetooth and/or WIFI and operating conjunctively with the interfacing software application written and developed in languages such JavaScript, C++, Objective-C, and others natively integrated in the mobile or computer operating system, advantageously allows for remote control operation of the multipurpose blower assembly. For example, the interfacing software application may comprise options for setting operating parameters directed to the electrical gear motor and linear actuator, developing schedules of operation, transmitting communicative messaging in the form of alerts and warnings to the user operator upon certain events, monitoring conditions of operation and interrupts, conducting performance readings and diagnostic functions, and serving as a Smart Home interface.

Figure 42:
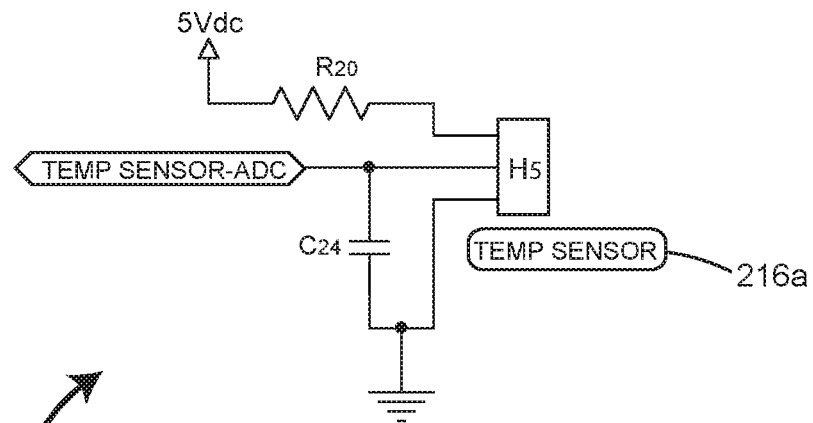
FIG. 42 is a schematic diagram of a temperature feedback circuit integrated within a system controller for communicating with a temperature sensor.
Figure 43:
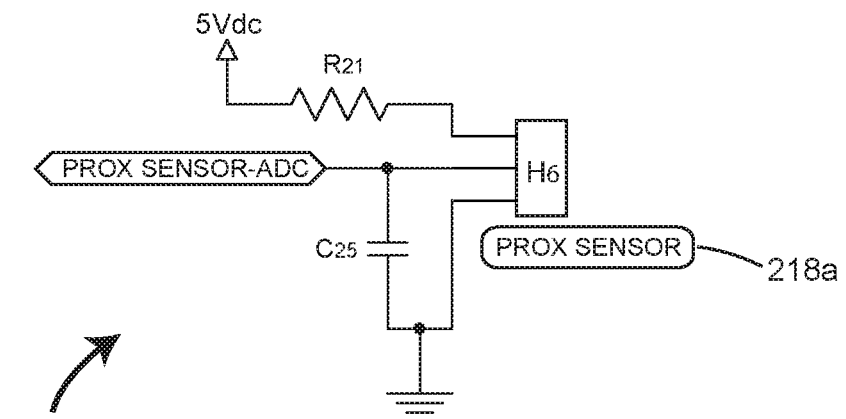
FIG. 43 is a schematic diagram of a proximity feedback circuit integrated within a system controller for communicating with a proximity sensor.
Figure 44:
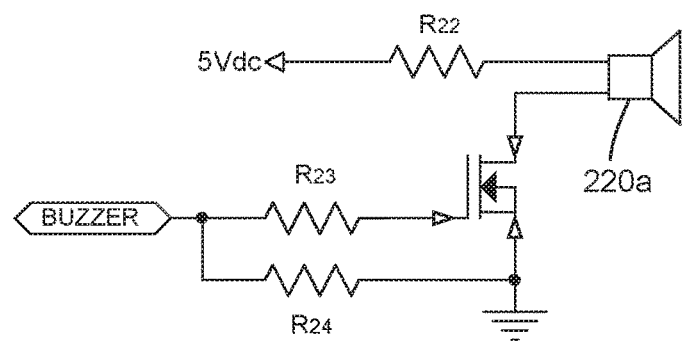
FIG. 44 is a schematic diagram of an audio circuit integrated within a system controller.

As respectively illustrated in FIGS. 42 and 43, the system controller 40 is supplemented with a temperature feedback circuit 216 that comprises a temperature sensor 216*a* suited for placement within the water body and connects through header $H_5$ for reading in real time ambient water temperatures for input into RAM and is communicatively coupled to the microcontroller through connector TEMP SENSOR-ADC, and a proximity feedback circuit 218 that comprises a proximity sensor 218*a* connected through header $H_6$ and is communicatively coupled to the microcontroller 184 through connector PROX SENSOR-ADC to enable detection of nearby objects, humans, and so forth placed in vicinity of the multipurpose blower assembly 10. The temperature feedback circuit 216 advantageously provides for measurement of the water temperature in vicinity of the multipurpose blower assembly, whereupon comparison of a predetermined temperature set point with that of the measured temperature readings as input variables may activate and/or deactivate select operational features associated with the multipurpose blower assembly Similarly, the proximity feedback circuit 218 can fulfill safe operation of the multipurpose blower assembly in the form of operational deactivation when measured distance inputs made through the proximity sensor 218*a* determine that nearby objects such as wildlife and humans, for example, fall within a distance set point to pose as a threat for continued, safe operation of the multipurpose blower assembly 10. Other aspects of notification to the user operator besides that of the LED indicator lamps 82 of the manual interface panel 76 include an audio circuit 220 of the type shown in FIG. 44, where connector BUZZER is communicatively coupled to the microcontroller to pass generated signal outputs upon certain events of operation for audible notification to the user operator though an onboard speaker 220*a*, events such as operational interrupts, presence of nearby objects detected by the proximity sensor 218*a* of the proximity feedback circuit 218, confirmation of user operator settings, and so forth.

Figure 45:
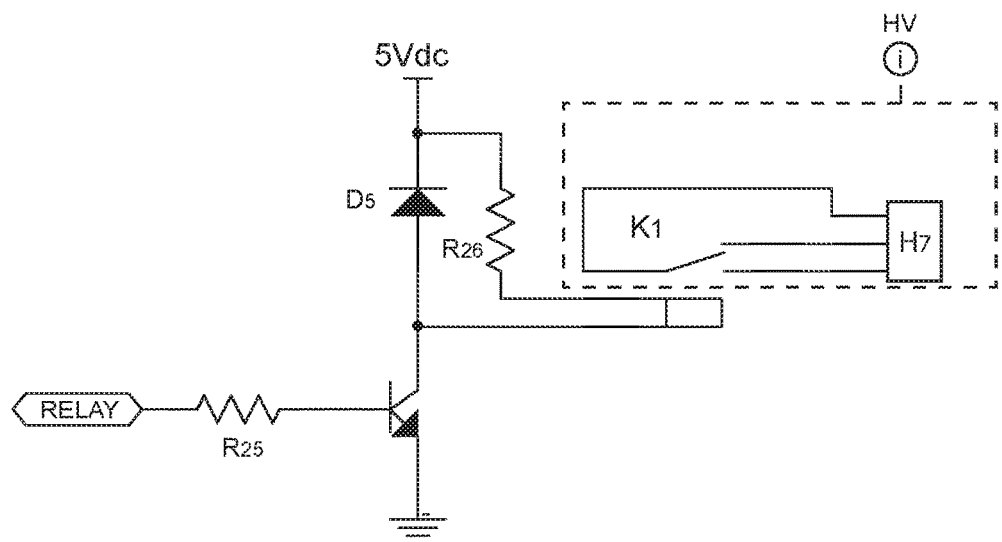
FIG. 45 is a schematic diagram of an auxiliary circuit integrated within a system controller.
Figure 46:
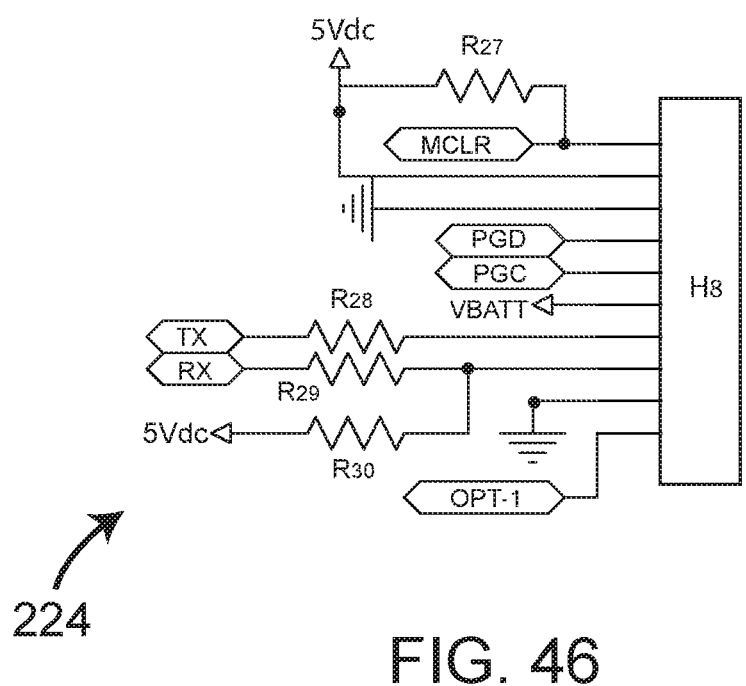
FIG. 46 is a schematic diagram of a diagnostic circuit for communicative coupling to a microcontroller on a temporary basis.

As generally depicted in FIG. 45, the system controller further comprises an auxiliary circuit 222 in the form of a high voltage relay $K_1$ that offers to supply through onboard control high voltage HV power to auxiliary devices that may supplement the usefulness of the multipurpose blower assembly 10, such as lighting, cameras, supplemental alarm indicators and so forth, where connector RELAY is communicatively coupled to the microcontroller 184 to pass generated signals to activate and deactivate the auxiliary devices in accord with the programmable instruction set. In other aspects of operation, the system controller is configured to communicate with a diagnostic circuit 224 in FIG. 46 that exists apart from the system controller and is used in programming the microcontroller with the required programmable instruction set for execution thereby. The diagnostic circuit is communicatively coupled to the microcontroller on a temporary basis for purposes of initial programming, where connectors TX and RX respectively serve to transmit and receive data, connectors PGD (data) and PGC (clock) serve as programming ports, and connector MCLR serves to reset the microcontroller 184 in general instances of loading the programmable instruction set into program memory 184*b*.

Now by way of describing a series of state diagrams represented in FIGS. 47-54 one will appreciably gain further insight as to the functionality and operation of the multipurpose blower assembly 10 in fulfilling its utilitarian objectives set forth herein.

Figure 47:
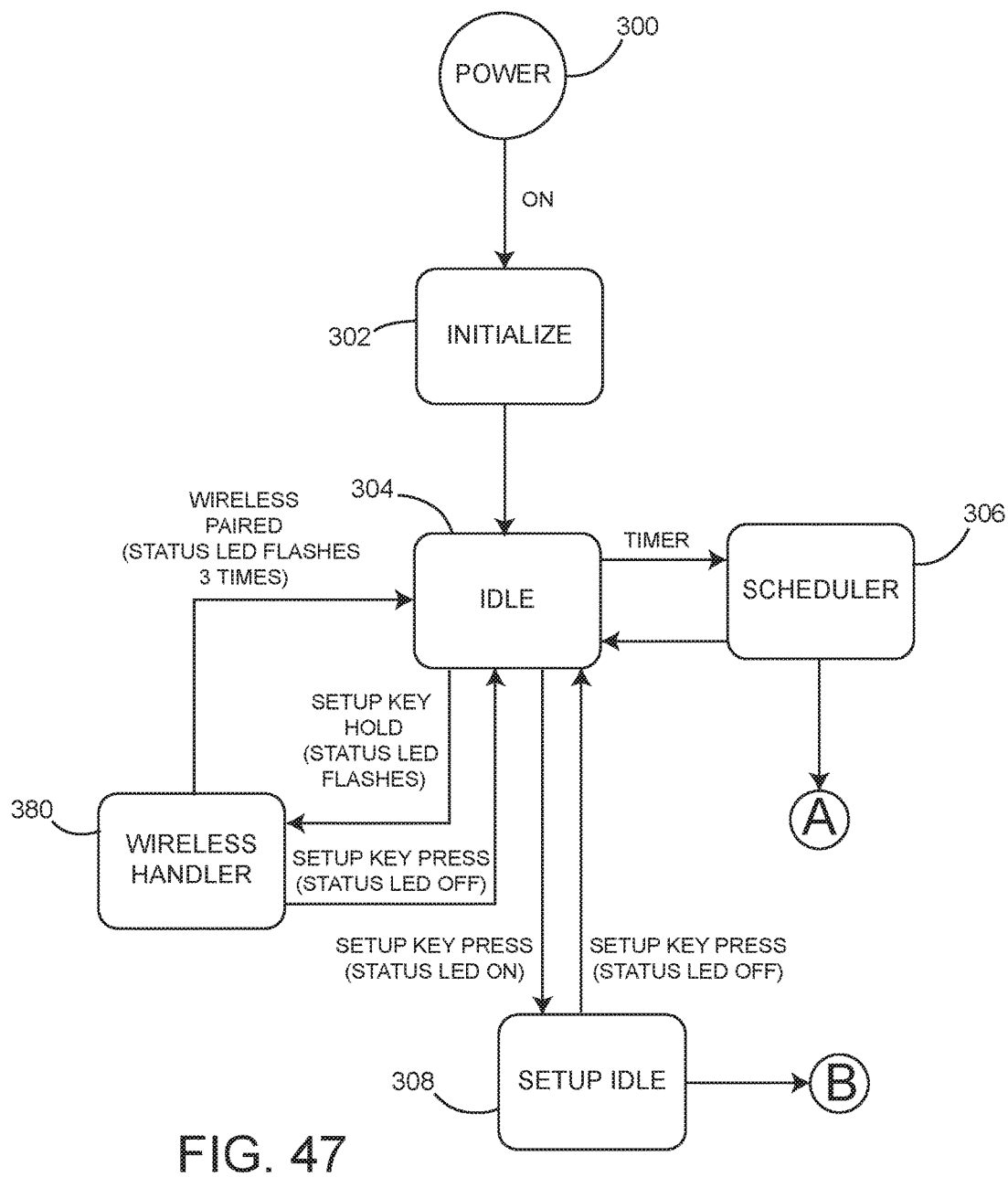
FIG. 47 is a state diagram illustrating state events directed to power input and initialization of a microcontroller.

As shown in FIG. 47, power is initially supplied to and turns "On" the system controller 40 to a stabilized voltage at state 300 whereupon the system controller is initialized at state 302 to setup input, output and communication ports, clear data memory in RAM, set the internal clock speed and memory registers, and so forth. At state 304 the microcontroller is held at idle until user operator inputs are entered through the manual interface panel 76 or through the interfacing software application that communicates with the microcontroller by wireless means in the form of Bluetooth and/or WIFI connectively, wherein the user operator inputs are directed in setting the clockwise (CW) and counterclockwise (CCW) endpoint positions 81*a*, 81*b* from a full range of radial movement (10-360 degrees) designated for the output shaft 52 of the electrical gear motor 44, as primarily shown in FIG. 35. Also at state 304, after a predetermined time interval, a scheduler becomes available at state 306 to monitor conditions of operability based on user operator inputs as well as other conditions of operation (e.g. battery level).

In the event of pressing the setup key 78 while at state 304 in FIG. 47, the setup LED 82*b* goes to "On" and enters into setup idle at state 308, whereupon it waits for entry of user operator inputs. If the setup key is pressed once again while at state 308, the setup LED is turned "Off" and returns to idle at state 304. Where the user operator presses the CCW key 80*b* while at state 308, the setup LED 82*b* blinks slowly to signify transition into CCW setup idle at state 310 in FIG. 48. If the setup key is pressed while at state 310, the setup LED goes to "On" and returns to state 308. Where the CCW key is pressed and the setup LED continues to blink slow, the microcontroller executes rotation of the output shaft 52 of the electrical gear motor and accompanying lower assembly 16 counterclockwise until release of the CCW key such to set the CCW endpoint position 81*b* at state 312 with return to state 310. In the event that the user operator exceeds or overthrows the desired CCW endpoint position such to necessitate correction, at state 310, the user operator can elect to hold down the CW key 80*a*, which prompts the setup LED to blink slow and allow rotational movement of the output shaft 52 of the electrical gear motor and accompanying lower assembly clockwise until release of the CW key such to finally attain and set the CCW endpoint position 81*b* at state 314 with return to state 310. Upon pressing the setup key 78 at state 310, setup functionality returns to state 308 for continued setting of the CW endpoint position.

Figure 48:
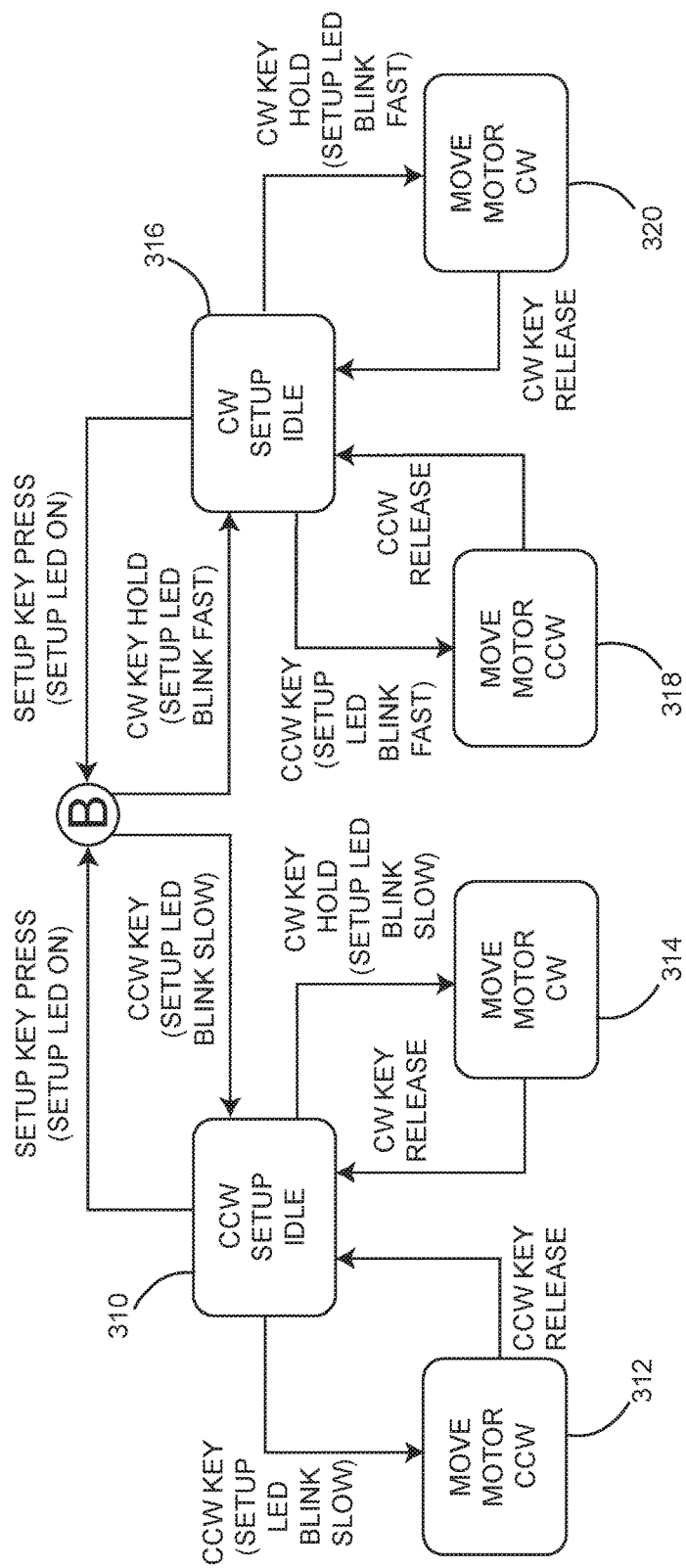
FIG. 48 is a state diagram illustrating state events directed in setting clockwise (CW) and counterclockwise (CCW) endpoint positions.

At state 308 in FIG. 47, while the CW key is pressed, the setup LED is prompted to blink fast to signify transition to CW setup idle at state 316 in FIG. 48, whereas release of the CW key 80*a* followed by press of the setup key 78 prompts the setup LED 82*b* to go "On" and return to state 308. While the CW key continues to be pressed, the microcontroller executes rotation of the output shaft of the electrical gear motor 44 and accompanying lower assembly 16 clockwise until release of the CW key such to set the CW endpoint position 81*a* at state 320 with return to state 316 Similar to that of attaining the final setting of the CCW end position 81*b*, correction of the CW end position can occur at state 316, where pressing and holding downward the CCW key 80*b* prompts the setup LED 82*b* to blink fast and rotate the output shaft 52 of the electrical gear motor 44 and accompanying lower assembly 16 counterclockwise until release of the CCW key at state 318 followed by return to state 316.

As generally represented in FIGS. 47 and 49-54, the scheduler at state 306 monitors the conditions by which the electrical gear motor 44 and linear actuator 136 operate under the control of their respective logic circuits of the system controller 40 as well as battery status, and if conditions of operation are adverse or counter to the operating parameters set forth in the programmable instruction set, the microcontroller executes interrupts of select logic circuits until resolution thereof, particularly ensuring safe operation of the multipurpose blower assembly 10.

Figure 50:
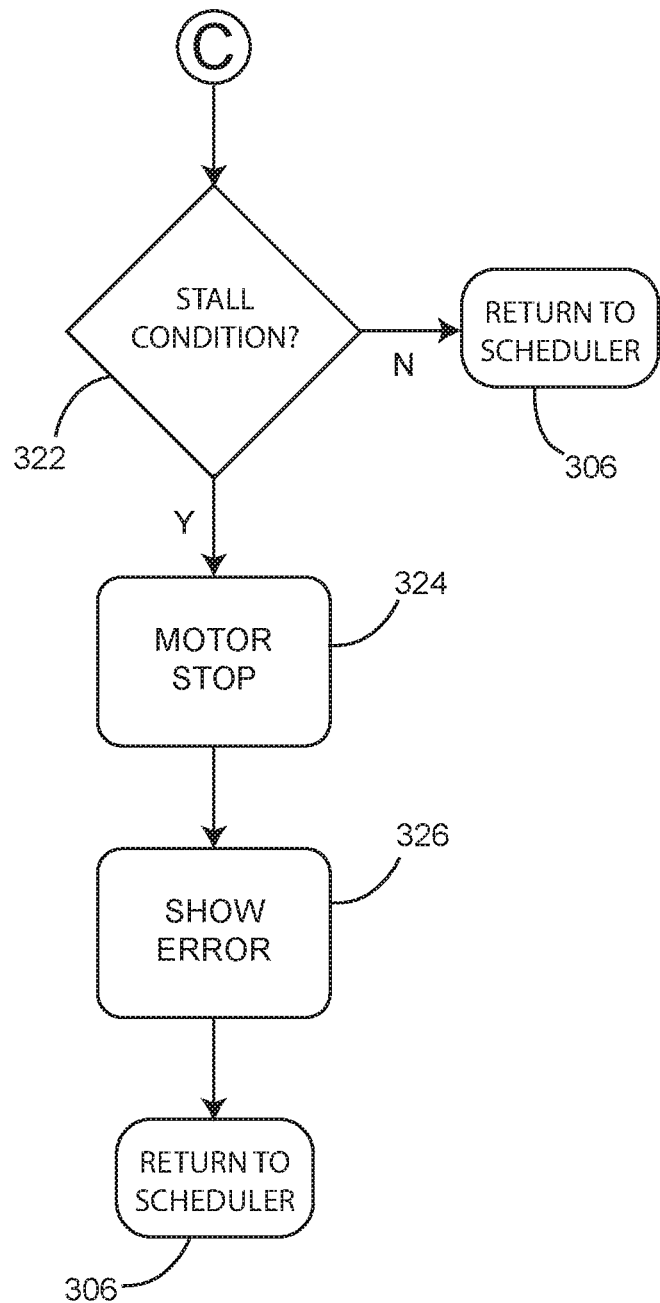
FIG. 50 is a state diagram illustrating state events directed to a stall condition handled by a scheduler.

In FIG. 50, the scheduler at state 306 monitors for a stall condition of the electrical gear motor at state 322 and if no stall condition is realized, state 322 returns to state 306 for continued monitoring of conditions by the scheduler. If a stall condition is realized at state 322, the microcontroller 184 interrupts and the electrical gear motor 44 is deactivated at state 324 whereupon an error message is generated at state 326. Where a stall condition is realized, possibly by the occurrence of an object interfering with the rotation of the lower assembly 16, the programmable instruction set includes executable instructions that allow a predetermined amount of radial variance or drift of the output shaft of the electrical gear motor before re-attempting to auto-correct the position and attain the set value of the radial increment of movement 198 by the user operator. In the case of resolving the stall condition causing the error message, such as by removing of the interfering object with that of the lower assembly, for example, the scheduler becomes reactivated at state 306 for continued monitoring of operating conditions.

Figure 51:
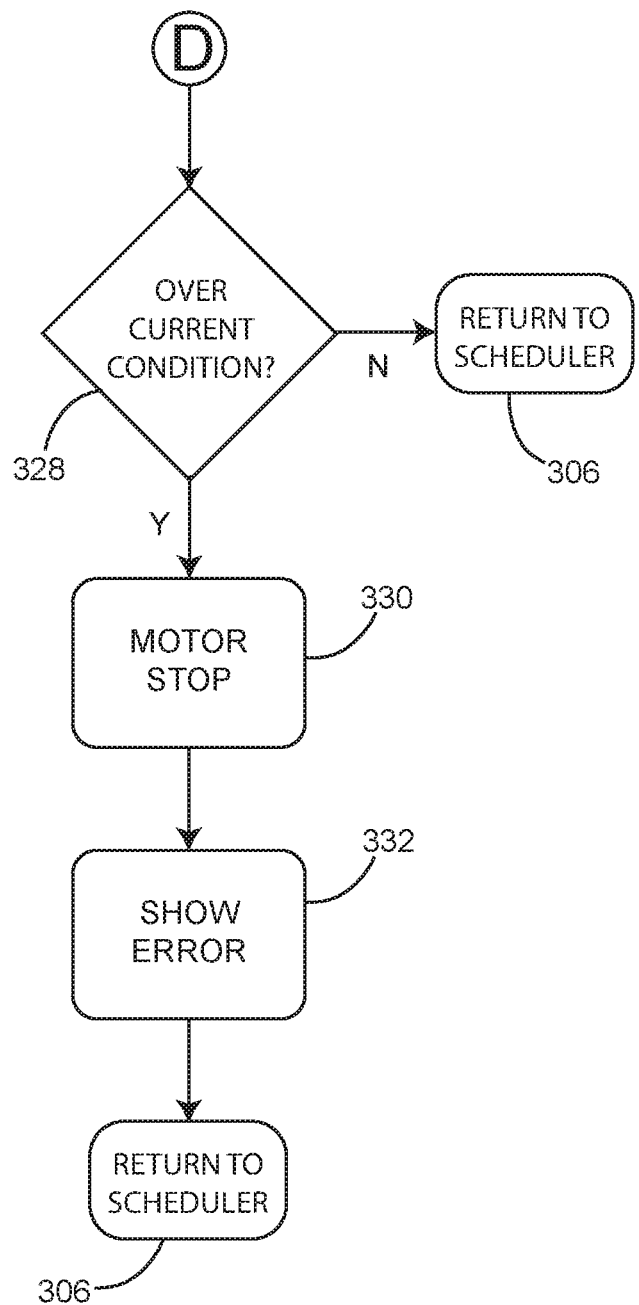
FIG. 51 is a state diagram illustrating state events directed to an over-current condition handled by a scheduler.

As shown in FIG. 51, the scheduler at state 306 also monitors for an overcurrent condition of the electrical gear motor 44 at state 326 and if no overcurrent condition is realized, state 328 returns to state 306 for continued monitoring of conditions. If an overcurrent condition is realized at state 328, the microcontroller interrupts and the electrical gear motor is deactivated at state 330 whereupon an error message is generated at state 332. Interrupts of this nature and those caused by a recognized stall condition at state 322 may prompt the microcontroller to execute commands to activate audible and visual alerts onboard and through the interfacing software application to signify an adverse condition requiring correction, in addition to the deactivation of the electrical gear motor. In the event of resolving the basis of the error message, state 332 returns to the scheduler at state 306.

Figure 49:
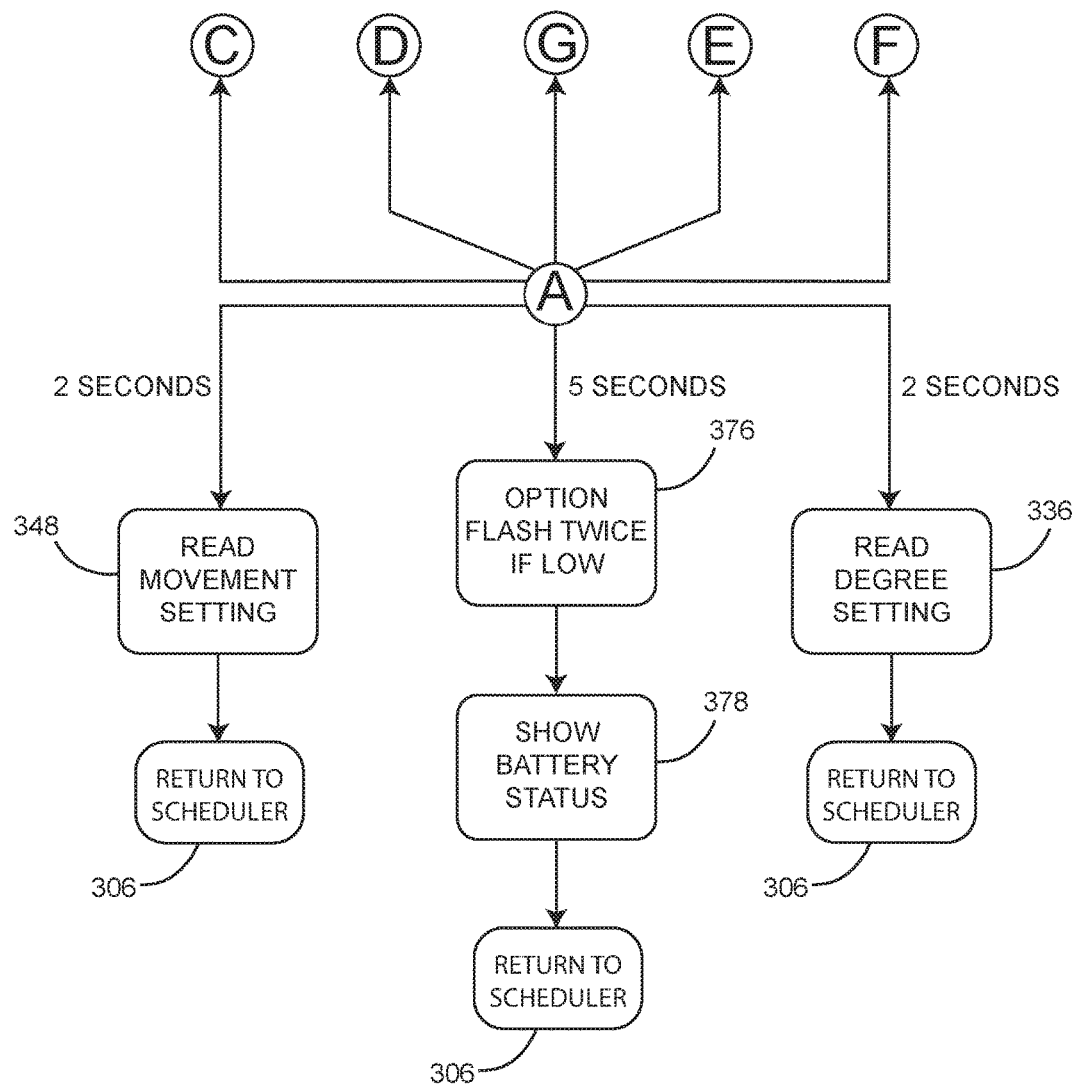
FIG. 49 is a state diagram illustrating state events directed to movement management of radial positions and battery status handled by a scheduler.
Figure 52:
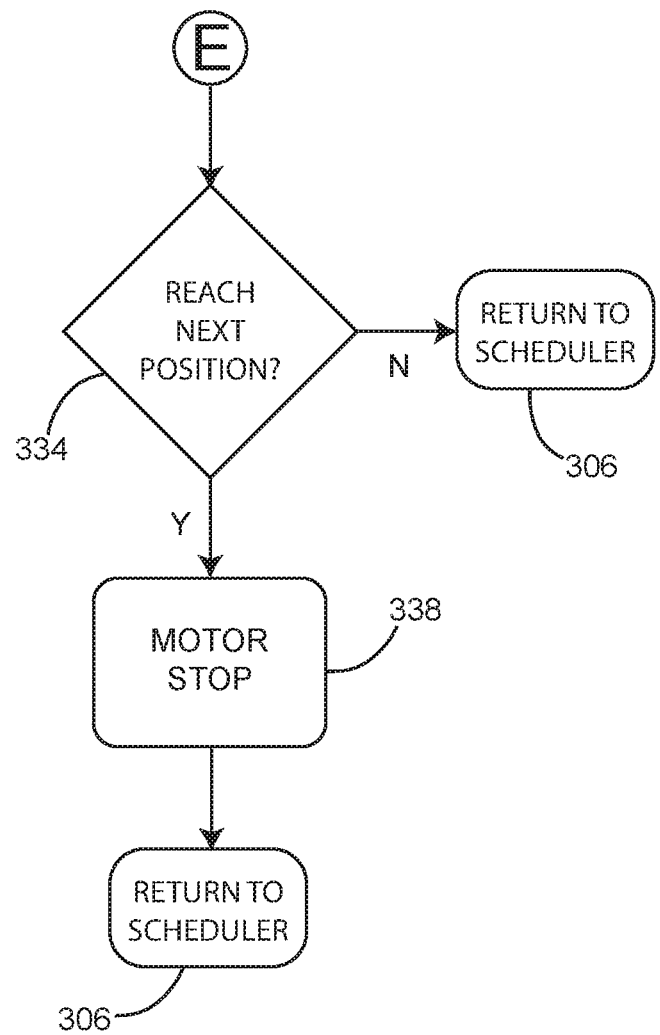
FIG. 52 is a state diagram illustrating state events directed to detection and placement of radial positions handled by a scheduler.

The scheduler at state 306 continues to monitor the position of the electrical gear motor 44 and connected lower assembly 16, and at state 334 in FIG. 52, under the assistance of the read degrees setting at state 336 in FIG. 49, determines whether the radial increment of movement 198 has been reached in accord with the user operator input manually made though the first potentiometer of the radial movement control circuit 194 in FIG. 33, and if not, state 334 proceeds to state 306 for continued monitoring of operating conditions by the scheduler. If, on the other hand, the lower assembly 16 has reached the radial increment of movement, the electrical gear motor stops and remains idle at state 338 and proceeds to state 306 for continued monitoring by the scheduler for the duration of the idle time set by the user operator using the second potentiometer of the momentary idle time circuit 196 in FIG. 34, which allots a momentary idle time of 1 to 60 minutes. In instances where the radial increment of movement 198 deviates from its hold position by an allowable amount of radial variation or dither provided in the programmable instruction set, such by reason of start and stop sequences of the electrical gear motor or an object interfering with movement of the lower assembly 16 causing a stall condition as described above, the scheduler will prompt the microcontroller 184, under the assistance of the read degrees setting at state 336, to advance the electrical gear motor in a manner that auto-corrects to or attains the set value of the radial increment of movement.

Figure 53:
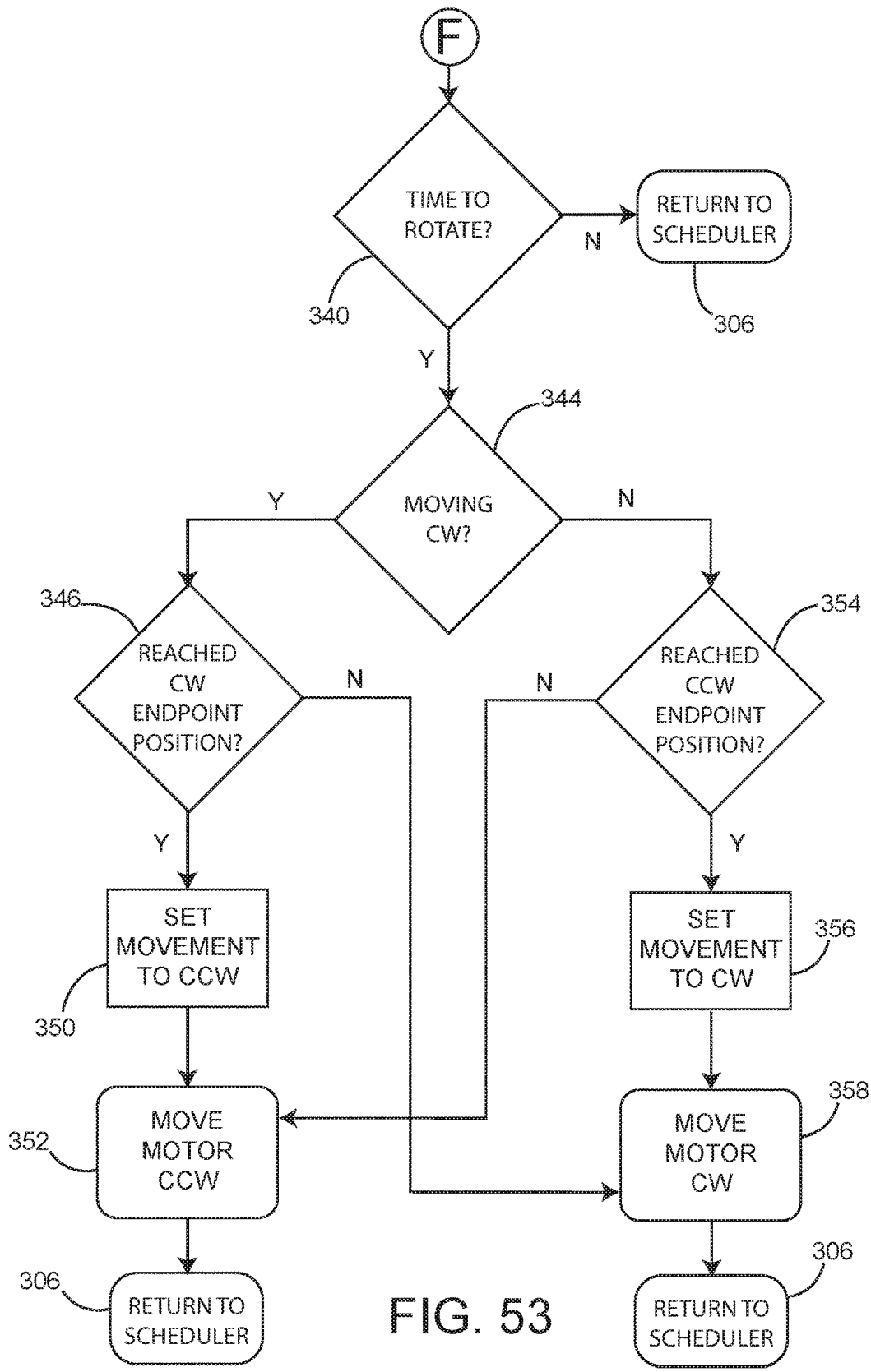
FIG. 53 is a state diagram illustrating state events directed to a scheduler's handling of radial directional movement based on CW and CCW endpoint positions.

As depicted in FIG. 53, the scheduler at state 306 further monitors the condition by which the electrical gear motor 44 is activated to rotate the attached lower assembly at state 340 to the next radial increment of movement 198 until a change of direction is required upon reaching the CW endpoint position 81*a* or the CCW endpoint position 81*b* based on a periodic read movement setting at state 348 in FIG. 49, and where is not ready to rotate, state 340 returns to state 306 for continued monitoring by the scheduler.

If the time to rotate at state 340 is affirmative, the microcontroller 184 prompts the electrical gear motor 44 and attached lower assembly 16 to rotate clockwise to the next radial increment of movement at state 344 and sequentially rotate clockwise at state 344 until affirmatively reaching the CW endpoint position 81*a* at state 346. If in the event that the radial increment of movement is set by the user operator to exceed or overthrow the CW endpoint position, generally being observed at its last stopping position before changing rotatory direction, the microcontroller in accord with the programmable instruction set will continue to advance the electrical gear motor clockwise to the CW endpoint position and will change rotatory direction thereat but will advance counterclockwise by the amount exceeding the CW endpoint position followed by resuming the radial increment of movement set by the user operator in the counterclockwise direction.

If the CW endpoint position is attained, the microcontroller at state 350 sets for counterclockwise movement and at state 352 rotates the electrical gear motor counterclockwise followed by continued monitoring by the scheduler at state 306. If the CW endpoint position is not attained at state 346, the electrical gear motor continues to operate clockwise followed by continued monitoring by the scheduler at state 306. If the electrical gear motor is not moving clockwise at state 344, but the CCW endpoint position has been reached at state 354, the microcontroller at state 356 sets for clockwise movement and at state 358 rotates the electrical gear motor clockwise followed by continued monitoring by the scheduler at state 306. If the CCW endpoint position 81b is not attained at state 354, the electrical gear motor continues to operate counterclockwise followed by continued monitoring by the scheduler at state 306. Like above, if in the event that the radial increment of movement 198 is set to exceed or overthrow the CCW endpoint position, generally occurring at its last stopping position before changing rotatory direction, the microcontroller in accord with the instruction set will continue to advance the electrical gear motor counterclockwise to the CCW endpoint position and will change rotatory direction thereat but will advance clockwise by the amount exceeding the CCW endpoint position 81b followed by the radial increment of movement set by the user operator in the clockwise direction.

In addition to scheduler's capability at state 306 of monitoring system functions relating to rotation of the output shaft 52 of the electrical gear motor 44 and connected lower assembly, the scheduler monitors the conditions by which the linear actuator 136 operates in accord with pre-defined set of operating parameters incorporated within the interfacing software application residing on the electronic device for communication with the microcontroller via wireless means for execution of operative commands or instructions that effect controlled operability of applicable logic circuits.

Figure 54:
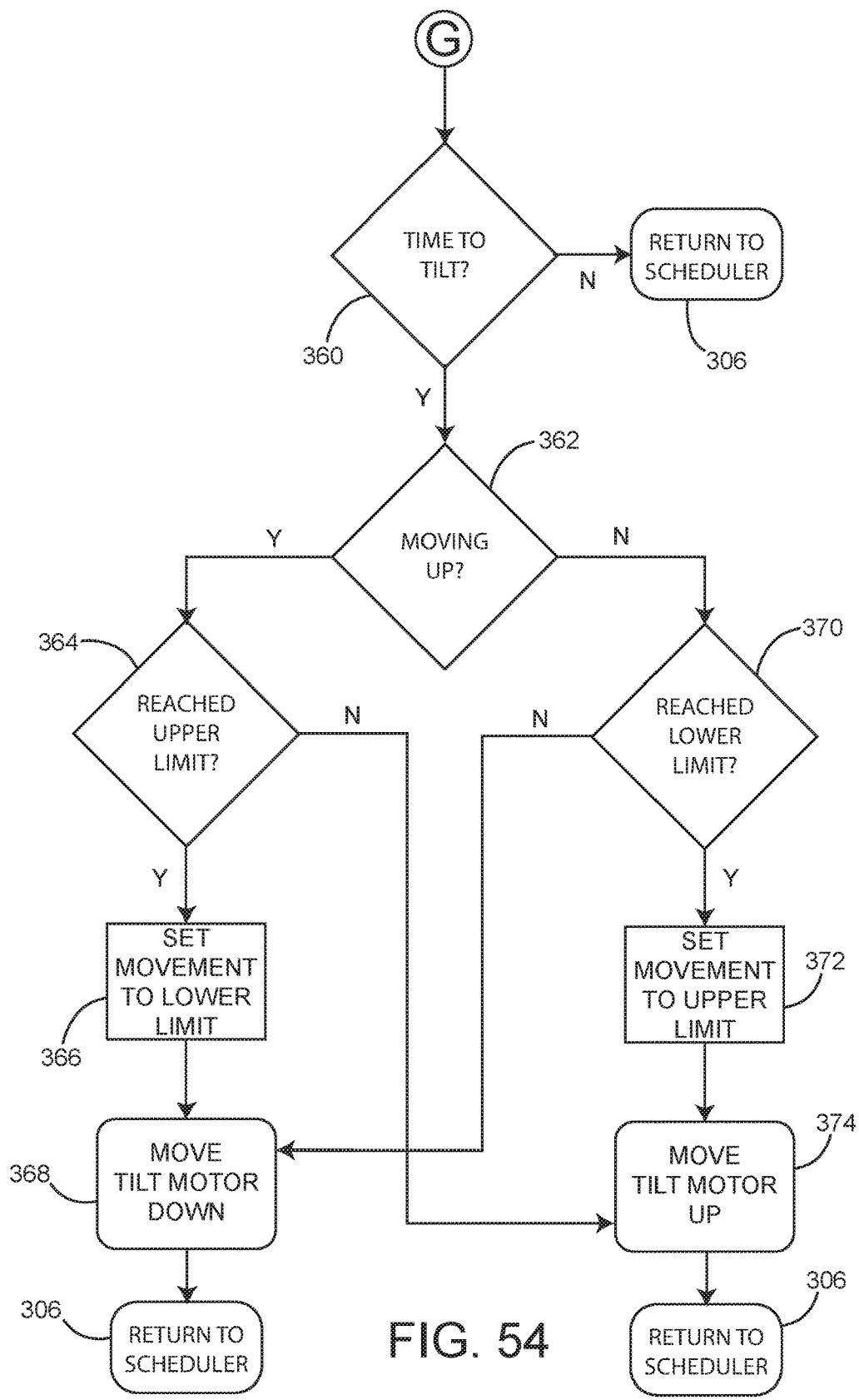
FIG. 54 is a state diagram illustrating state events directed to a scheduler's handling of tilt movement relating to a linear actuator.

In FIG. 54, the scheduler at state 306 monitors the conditions by which the linear actuator 136 moves upward or downward to effect the angular tilt of the lower assembly 16 at state 360, and if not appropriate, state 360 returns to state 306 for continued monitoring by the scheduler. If in the affirmative at state 360, the linear actuator is prompted to move upward with continued movement upward at state 362 until affirmatively reaching an upper limit of movement at state 364. If the upper limit of movement is realized, the microcontroller at state 366 sets the linear actuator to move downward with continued movement downward at state 368 until affirmatively reaching a lower limit at state 370. Conversely, if the lower limit is realized, the microcontroller at state 372 sets the linear actuator to move upward with continued movement upward at state 374 until affirmatively reaching an upper limit at state 364, after which the scheduler at state 306 continues to monitor the directional upward and downward movement sequence of the linear actuator based on user operator settings made through the interfacing software application and communicated to the microcontroller for execution of instructions that effect the control of the logic circuits associated with the linear actuator.

In furthering the capability of the multipurpose blower assembly 10, the scheduler monitors conditions of power available for proper operation of the logic circuits and connected components, whereupon realization of low power, option flash at state 376 in FIG. 49 is activated to flash twice every 5 seconds with a battery status indicator being available at state 378. If power at adequate levels is available for system operation, state 376 returns to the scheduler at state 306.

As shown in FIG. 47, idle at state 304 also communicates with wireless technology at state 380 in the form of Bluetooth and/or WIFI connectivity that affords capability of the multipurpose blower assembly 10 to communicate operating parameters residing in the conventionally developed and prepared interfacing software application for transmission to and communication with the microcontroller for execution thereby to control select logic circuits generally relating to operation of the electrical gear motor 44 and linear actuator 136 as well as other operative components. It is conceivable within the scope of this disclosure that wireless means may control operation of the linear actuator (upward and downward stroke movements) to effect angular adjustment of the lower assembly 16 and connected blower motor 146; rotation of the output shaft 52 of the electrical gear motor 44 to effect forward and reverse operation thereof such to further setting of the CW and CCW endpoint positions 81a, 81b to the likes offered through the manual interface panel 76 in FIG. 16, set the radial increment of movement 198 and the momentary idle state to the likes respectively provided by the first and second potentiometers in FIGS. 33 and 34; produce and emit visual and audible alerts sufficing as means of notification to the user operator of certain events associated with operation of the multipurpose blower assembly 10; control functionality of the temperature and proximity sensors 216a, 218a, as shown in FIGS. 42 and 43, for purposes of enhanced operation and safety; and control of auxiliary devices in the nature of cameras, lighting, and so forth through the auxiliary circuit 222. As shown in FIG. 47, wireless communicative devices in the form of Bluetooth and/or WIFI may connect during idle at state 304 upon hold of the setup key 78 that prompts the status LED 82c to flash until pairing of the wireless technology is realized with confirmation thereof being indicated by the status LED flashing three times, whereas a momentary press of the setup key deactivates connection for return to idle at state 304.

It is obvious that the components comprising the multipurpose blower assembly 10 may be fabricated from a variety of materials, providing such selection or use of materials possess the capacity to withstand forces acting thereon throughout its duration of use in stimulating flow in underwater environments.

Accordingly, it is most desirable, and therefore preferred, to construct the structural components of the multipurpose blower assembly 10 from aluminum, steel coated with a polymeric or epoxy paint or equivalent, stainless steel, or an equivalent type of material capable of preventing premature corrosion of the substrate while in the presence of a fresh or salt water environment. To lessen the cost and simplify construction of the multipurpose blower assembly and increase its overall structural integrity, the mount post 86 may be preferably welded at its upper and lower ends to the top and mid-support plates 20, 88.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. A multipurpose blower assembly for attachment to a supportive structure located adjacent to a water body, said multipurpose blower assembly comprising, in combination:
an upper assembly being configured to reside above the water body's surface and having a top plate and an electrical gear motor mounted atop thereof, said electrical gear motor having an output shaft;
a lower assembly being configured to reside below the water body's surface and having a blower motor;
angular tilt means for angularly positioning said blower motor;

a rotating shaft having a first end coupled to said output shaft of the electrical gear motor and a second end coupled to said lower assembly;

a mount post having an upper end attached to said top plate and a lower end attached to a mid-support plate, said mid-support plate having an aperture extending therethrough for passing a select portion of the rotating shaft;

a system controller having a microcontroller configured with a central processing unit, a program memory module for receiving and storing a programmable instruction set capable of controlling operation of said electrical gear motor, a non-volatile memory module for storing user operator inputs, and a volatile memory module for storing temporary data generated and processed by the central processing unit;

a motor controller communicatively coupled to said microcontroller for controlling operation of said electrical gear motor; and input-setting means communicatively coupled to said microcontroller for setting a clockwise endpoint position and a counterclockwise endpoint position of said output shaft for storage into said non-volatile memory module.

2. The multipurpose blower assembly as set forth in claim 1, wherein said input-setting means comprises a manual interface panel communicatively coupled to said microcontroller and having a setup key operating conjunctively with a clockwise key and a counterclockwise key for setting the clockwise and counterclockwise endpoint positions of said output shaft for storage into said non-volatile memory module.

3. The multipurpose blower assembly as set forth in claim 1, wherein said motor controller comprise an H-bridge circuit communicatively coupled to said microcontroller, said programmable instruction set having executable instructions for activating said H-bridge circuit to supply power to said electrical gear motor and effect interchanging clockwise and counterclockwise rotation of said output shaft after respectively reaching said counterclockwise and clockwise endpoint positions, said H-bridge circuit having a motor feedback loop for monitoring operative conditions of said electrical gear motor.

4. The multipurpose blower assembly as set forth in claim 1, wherein said system controller comprises a radial movement control circuit communicatively coupled to said microcontroller and having a first potentiometer for setting a radial increment of movement from within a range of the clockwise and counterclockwise endpoint positions.

5. The multipurpose blower assembly as set forth in claim 4, wherein said system controller comprises a momentary idle time circuit communicatively coupled to said microcontroller and having a second potentiometer for setting a momentary idle state from one to sixty minutes by which said output shaft of the electrical gear motor remains idle after advancing to said radial increment of movement.

6. The multipurpose blower assembly as set forth in claim 5, wherein said system controller comprises a position sensor circuit communicatively coupled to said microcontroller and having a rotary position sensor mounted to said output shaft of the electrical gear motor for generating rotatory position inputs for storage into said volatile memory module and processing by the central processing unit in accord with said programmable instruction set.

7. The multipurpose blower assembly as set forth in claim 6, wherein said programmable instruction set comprises executable instructions for periodic monitoring of said radial increment of movement by said rotary position sensor during activation of said momentary idle time in determination of deviation from the user operator input and activating said electrical gear motor to re-attain said radial increment of movement in instances of deviation.

8. The multipurpose blower assembly as set forth in claim 1, wherein said lower assembly comprises an upper bracket attached to said second end of the rotating shaft and a lower bracket pivotally connected to said upper bracket.

9. The multipurpose blower assembly as set forth in claim 8, wherein said angular tilt means comprises a semi-radial pattern of apertures co-extending through said upper bracket and said lower bracket, said lower bracket having a motor support plate for mounting said blower motor, said upper bracket and said lower bracket each having an aperture from the semi-radial pattern of apertures in alignment with one another to receive a bolt and nut assembly.

10. The multipurpose blower assembly as set forth in claim 8, wherein said angular tilt means comprises a linear actuator having a body portion configured with an upper end attached to said first end of the rotating shaft and a tie rod configured with an end attached to said lower bracket, said lower bracket having a motor support plate for mounting said blower motor.

11. The multipurpose blower assembly as set forth in claim 10, wherein said system controller comprises a tilt control circuit communicatively coupled to said microcontroller, said programmable instruction set having executable instructions for activating said tilt control circuit to effect upward and downward stroke movement of the tie rod based on user operator inputs stored in said non-volatile memory module, said tilt control circuit having an onboard power management switching circuit for regulating and supplying power to said linear actuator.

12. The multipurpose blower assembly as set forth in claim 11, wherein said system controller comprises a tilt feedback circuit communicatively coupled to said microcontroller and having a tilt position sensor electrically coupled to said linear actuator for generating tilt position inputs for storage into said volatile memory module and processing by the central processing unit in accord with said programmable instruction set, said tilt feedback circuit being configured to operate contemporaneously with said tilt control circuit through said microcontroller.

13. The multipurpose blower assembly as set forth in claim 12, wherein said system controller comprises wireless operating means communicatively coupled to said microcontroller and being capable of providing two-way communication between said microcontroller and an electronic device to configurably enable remote control operation of said electrical gear motor and said linear actuator.

14. The multipurpose blower assembly as set forth in claim 13, wherein said wireless operating means comprises a Bluetooth circuit communicatively coupled to said microcontroller, said programmable instruction set having executable instructions for activating said Bluetooth circuit to communicate operating parameters generated by the user operator through the electronic device for input into said non-volatile memory module and relaying to the user operator through the electronic device communicative messaging relating to operative conditions of said electrical gear motor and said linear actuator.

15. The multipurpose blower assembly as set forth in claim 13, wherein said wireless operating means comprises a WIFI circuit communicatively coupled to said microcontroller, said programmable instruction set having executable instructions for activating said WIFI circuit to communicate operating parameters generated by the user operator through the electronic device for input into said non-volatile memory module and relaying to the user operator through the electronic device communicative messaging relating to operative conditions of said electrical gear motor and said linear actuator.

16. The multipurpose blower assembly as set forth in claim 13, wherein said system controller comprises a temperature feedback circuit communicatively coupled to said microcontroller and having a temperature sensor placed within the water body for generating temperature inputs for storage into said volatile memory module and processing by said central processing unit in accord with said programmable instruction set, said programmable instruction set having executable instructions for activating or deactivating operation of said electrical gear motor and said linear actuator based on generated temperature inputs comparatively evaluated with a temperature set point.

17. The multipurpose blower assembly as set forth in claim 12, wherein said system controller comprises a proximity feedback circuit communicatively coupled to said microcontroller and having a proximity sensor capable of generating measured distance inputs for storage into said volatile memory module, said programmable instruction set having executable instructions for activating or deactivating operation of said electrical gear motor and said linear actuator based on measured distance inputs comparatively evaluated with a distance set point.

18. The multipurpose blower assembly as set forth in claim 1, wherein said system controller comprises an audio circuit communicatively coupled to said microcontroller and having speakers capable of emitting generated sound waves, said programmable instruction set having executable instructions for activating said audio circuit to emit audible alerts upon predetermined events of operation.

19. The multipurpose blower assembly as set forth in claim 1, wherein said system controller comprises an auxiliary circuit communicatively coupled to said microcontroller and having a high voltage relay configured to supply electrical power to and operate one or more auxiliary devices based on user operator inputs stored in said non-volatile memory module.

20. The multipurpose blower assembly as set forth in claim 1, wherein said system controller comprises a regulator circuit communicatively coupled to said microcontroller and having a low-dropout voltage regulator for monitoring and regulating a supplied voltage in view of a voltage set point.

21. The multipurpose blower assembly as set forth in claim 2, wherein said upper assembly comprises a box-shaped cover attached to said top plate for housing and protecting said system controller and said electrical gear motor, said box-shaped cover having a side configured with said manual interface panel.

22. The multipurpose blower assembly as set forth in claim 1, wherein said rotating shaft comprises an indicator pin attached thereto and being directionally orientated to correspond with the direction of radial outward flow of water generated by said blower motor.

23. The multipurpose blower assembly as set forth in claim 1, wherein said upper assembly comprises a bearing mount attached to said top plate, said bearing mount having a bearing race configured with a cylindrical sleeve for accepting and holding therewithin said first end of the rotating shaft.

24. The multipurpose blower assembly as set forth in claim 1, further comprising a mount bracket having a back plate attached to a cantilevered plate, said back plate being adapted to connect to the supportive structure near the water body, said cantilevered plate having a compression block configured for connection to said mount post.

25. A multipurpose blower assembly for attachment to a supportive structure located adjacent to a water body, said multipurpose blower assembly comprising, in combination:
an upper assembly being configured to reside above the water body's surface and having a top plate and an electrical gear motor mounted atop thereof, said electrical gear motor having an output shaft;
a rotating shaft having a first end coupled to said output shaft of the electrical gear motor and a second end;
a lower assembly being configured to reside below the water body's surface and having a blower motor, an upper bracket attached to said second end of the rotating shaft and a lower bracket pivotally connected to said upper bracket, said lower bracket having a motor support plate for mounting said blower motor, said upper bracket and said lower bracket each having a semi-radial pattern of apertures, said upper bracket and said lower bracket each having an aperture from the semi-radial pattern of apertures in alignment with one another to receive a bolt and nut assembly;
a mount post having an upper end attached to said top plate and a lower end attached to a mid-support plate, said mid-support plate having an aperture extending therethrough for passing a select portion of the rotating shaft;
a system controller having a microcontroller configured with a central processing unit, a program memory module for receiving and storing a programmable instruction set capable of controlling operation of said electrical gear motor, a non-volatile memory module for storing user operator inputs, and a volatile memory module for storing temporary data generated and processed by the central processing unit;
a manual interface panel communicatively coupled to said microcontroller and having a setup key operating conjunctively with a clockwise key and a counterclockwise key for setting a clockwise endpoint position and a counterclockwise endpoint position of said output shaft for storage into said non-volatile memory module; and
an H-bridge circuit communicatively coupled to said microcontroller, said programmable instruction set having executable instructions for activating said H-bridge circuit to supply power to said electrical gear motor and effect interchanging clockwise and counterclockwise rotation of said output shaft after respectively reaching said counterclockwise and clockwise endpoint positions, said H-bridge circuit having a motor feedback loop for monitoring operative conditions of said electrical gear motor.

26. The multipurpose blower assembly as set forth in claim 25, wherein said system controller comprises a radial movement control circuit and a momentary idle time circuit each being communicatively coupled to said microcontroller, said radial movement control circuit having a first potentiometer for setting a radial increment of movement from within a range of the clockwise and counterclockwise endpoint positions, said momentary idle time circuit having a second potentiometer for setting a momentary idle state from one to sixty minutes by which said output shaft of the electrical gear motor remains idle after advancing to said radial increment of movement.

27. The multipurpose blower assembly as set forth in claim 26, wherein said system controller comprises a position sensor circuit communicatively coupled to said microcontroller and having a rotary position sensor mounted to said output shaft of the electrical gear motor for generating rotatory position inputs for storage into said volatile memory module and processing by the central processing unit in accord with said programmable instruction set.

28. The multipurpose blower assembly as set forth in claim 25, wherein said system controller comprises a temperature feedback circuit communicatively coupled to said microcontroller and having a temperature sensor placed within the water body for generating temperature inputs for storage into said volatile memory module and processing by said central processing unit in accord with said programmable instruction set, said programmable instruction set having executable instructions for activating or deactivating operation of said electrical gear motor based on generated temperature inputs comparatively evaluated with a temperature set point.

29. The multipurpose blower assembly as set forth in claim 25, wherein said system controller comprises a proximity feedback circuit communicatively coupled to said microcontroller and having a proximity sensor capable of generating measured distance inputs for storage into said volatile memory module, said programmable instruction set having executable instructions for activating or deactivating operation of said electrical gear motor based on measured distance inputs comparatively evaluated with a distance set point.

30. The multipurpose blower assembly as set forth in claim 25, wherein said system controller comprises an audio circuit and an auxiliary circuit each being communicatively coupled to said microcontroller, said audio circuit having speakers capable of emitting generated sound waves, said programmable instruction set having executable instructions for activating said audio circuit to emit audible alerts upon predetermined events of operation, said auxiliary circuit having a high voltage relay configured to supply electrical power to and operate one or more auxiliary devices based on user operator inputs stored in said non-volatile memory module.

31. The multipurpose blower assembly as set forth in claim 25, wherein said system controller comprises wireless operating means communicatively coupled to said microcontroller and being capable of providing two-way communication between said microcontroller and an electronic device to configurably enable remote control operation of said electrical gear motor.

32. A multipurpose blower assembly for attachment to a supportive structure located adjacent to a water body, said multipurpose blower assembly comprising, in combination:
an upper assembly being configured to reside above the water body's surface and having a top plate and an electrical gear motor mounted atop thereof, said electrical gear motor having an output shaft;
a rotating shaft having a first end coupled to said output shaft of the electrical gear motor and a second end;
a lower assembly being configured to reside below the water body's surface and having a blower motor, an upper bracket attached to said second end of the rotating shaft and a lower bracket pivotally connected to said upper bracket, said lower bracket having a motor support plate for mounting said blower motor;
a linear actuator having a body portion configured with an upper end attached to said first end of the rotating shaft and a tie rod configured with an end attached to said lower bracket;
a mount post having an upper end attached to said top plate and a lower end attached to a mid-support plate, said mid-support plate having an aperture extending therethrough for passing a select portion of the rotating shaft;
a system controller having a microcontroller configured with a central processing unit, a program memory module for receiving and storing a programmable instruction set capable of controlling operation of said electrical gear motor and said linear actuator, a non-volatile memory module for storing user operator inputs, and a volatile memory module for storing temporary data generated and processed by the central processing unit;
a manual interface panel communicatively coupled to said microcontroller and having a setup key operating conjunctively with a clockwise key and a counterclockwise key for setting a clockwise endpoint position and a counterclockwise endpoint position of said output shaft for storage into said non-volatile memory module; and
an H-bridge circuit communicatively coupled to said microcontroller, said programmable instruction set having executable instructions for activating said H-bridge circuit to supply power to said electrical gear motor and effect interchanging clockwise and counterclockwise rotation of said output shaft after respectively reaching said counterclockwise and clockwise endpoint positions, said H-bridge circuit having a motor feedback loop for monitoring operative conditions of said electrical gear motor.

33. The multipurpose blower assembly as set forth in claim 32, wherein said system controller comprises a radial movement control circuit and a momentary idle time circuit each being communicatively coupled to said microcontroller, said radial movement control circuit having a first potentiometer for setting a radial increment of movement from within a range of the clockwise and counterclockwise endpoint positions, said momentary idle time circuit having a second potentiometer for setting a momentary idle state from one to sixty minutes by which said output shaft of the electrical gear motor remains idle after advancing to said radial increment of movement.

34. The multipurpose blower assembly as set forth in claim 33, wherein said system controller comprises a position sensor circuit communicatively coupled to said microcontroller and having a rotary position sensor mounted to said output shaft of the electrical gear motor for generating rotatory position inputs for storage into said volatile memory module and processing by the central processing unit in accord with said programmable instruction set.

35. The multipurpose blower assembly as set forth in claim 33, wherein said system controller comprises a tilt control circuit communicatively coupled to said microcontroller, said programmable instruction set having executable instructions for activating said tilt control circuit to effect upward and downward stroke movement of the tie rod based on user operator inputs stored in said non-volatile memory module, said tilt control circuit having an onboard power management switching circuit for regulating and supplying power to said linear actuator.

36. The multipurpose blower assembly as set forth in claim 35, wherein said system controller comprises a tilt feedback circuit communicatively coupled to said microcontroller and having a tilt position sensor electrically coupled to said linear actuator for generating tilt position inputs for storage into said volatile memory module and processing by the central processing unit in accord with said programmable instruction set, said tilt feedback circuit being configured to operate contemporaneously with said tilt control circuit through said microcontroller.

37. The multipurpose blower assembly as set forth in claim 36, wherein said system controller comprises wireless operating means communicatively coupled to said microcontroller and being capable of providing two-way communication between said microcontroller and an electronic device to configurably enable remote control operation of said electrical gear motor and said linear actuator.

38. The multipurpose blower assembly as set forth in claim 32, wherein said system controller comprises an audio circuit and an auxiliary circuit each being communicatively coupled to said microcontroller, said audio circuit having speakers capable of emitting generated sound waves, said programmable instruction set having executable instructions for activating said audio circuit to emit audible alerts upon predetermined events of operation, said auxiliary circuit having a high voltage relay configured to supply electrical power to and operate one or more auxiliary devices based on user operator inputs stored in said non-volatile memory module.

\* \* \* \* \*